US009483702B2

(12) United States Patent
Fredembach

(10) Patent No.: US 9,483,702 B2
(45) Date of Patent: Nov. 1, 2016

(54) METHOD, APPARATUS AND SYSTEM FOR DETERMINING A SALIENCY MAP FOR AN INPUT IMAGE

(71) Applicant: CANON KABUSHIKI KAISHA, Tokyo (JP)

(72) Inventor: Clement Fredembach, Ultimo (AU)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 13/693,391

(22) Filed: Dec. 4, 2012

(65) Prior Publication Data

US 2013/0156320 A1    Jun. 20, 2013

(30) Foreign Application Priority Data

Dec. 14, 2011    (AU) .............................. 2011254040

(51) Int. Cl.
*G06K 9/00* (2006.01)
*G06K 9/46* (2006.01)
*G06T 7/00* (2006.01)

(52) U.S. Cl.
CPC .............. *G06K 9/46* (2013.01); *G06K 9/4652* (2013.01); *G06K 9/4671* (2013.01); *G06T 7/0081* (2013.01)

(58) Field of Classification Search
USPC ....... 382/100, 103, 164, 165, 173, 181, 190, 382/195, 224, 276, 282, 325
See application file for complete search history.

(56) References Cited

U.S. PATENT DOCUMENTS

| | | | |
|---|---|---|---|
| 6,232,974 B1 * | 5/2001 | Horvitz et al. ............... | 382/167 |
| 6,320,976 B1 * | 11/2001 | Murthy et al. ............... | 382/128 |
| 6,670,963 B2 * | 12/2003 | Osberger ............. | G06K 9/3233 382/180 |
| 7,130,461 B2 * | 10/2006 | Rosenholtz .......... | G06K 9/4652 382/165 |
| 7,471,827 B2 * | 12/2008 | Xie et al. ....................... | 382/173 |
| 7,593,602 B2 | 9/2009 | Stentiford | |
| 7,940,985 B2 | 5/2011 | Sun et al. | |
| 8,396,249 B1 * | 3/2013 | Khosla ................. | G06K 9/3241 382/103 |
| 2006/0182339 A1 * | 8/2006 | Connell ........................ | 382/170 |
| 2006/0215922 A1 * | 9/2006 | Koch et al. ................... | 382/248 |
| 2007/0116361 A1 * | 5/2007 | Le Meur et al. ............. | 382/181 |
| 2008/0304740 A1 * | 12/2008 | Sun et al. ..................... | 382/168 |
| 2009/0060267 A1 * | 3/2009 | Gu et al. ....................... | 382/100 |
| 2009/0263038 A1 * | 10/2009 | Luo et al. ..................... | 382/254 |

(Continued)

FOREIGN PATENT DOCUMENTS

EP    1 544 792 A1    6/2005

OTHER PUBLICATIONS

Scott Daly, "A Visual Model For Optimizing The Design Of Image Processing Algorithms", IEEE, Proceedings of IEEE International Conference Image Processing, vol. 2, Nov. 1994, pp. 16-20.*

(Continued)

*Primary Examiner* — Eric Rush
(74) *Attorney, Agent, or Firm* — Canon U.S.A., Inc. IP Division

(57) ABSTRACT

A method of determining a saliency map (e.g., 900) for an input image (e.g., 600) is disclosed. Pre-determined data defining relative salience of image features is accessed. The input image (600) is decomposed according to the predetermined data to identify features of the input image (600) corresponding to the image features in the predetermined data. A portion of the predetermined data corresponding to a range of the identified image features is selected. A perceptual scale is determined using the selected portion of the predetermined data. The saliency map (900) for the input image using the determined perceptual scale.

9 Claims, 19 Drawing Sheets

(56) References Cited

U.S. PATENT DOCUMENTS

| | | | |
|---|---|---|---|
| 2011/0158510 A1* | 6/2011 | Aguilar et al. | 382/159 |
| 2011/0229025 A1* | 9/2011 | Zhao | G06K 9/4671 382/195 |
| 2013/0022236 A1* | 1/2013 | Chang et al. | 382/103 |
| 2013/0028511 A1* | 1/2013 | Chamaret | G06K 9/4671 382/165 |
| 2013/0084013 A1* | 4/2013 | Tang | G06K 9/4671 382/195 |
| 2013/0124951 A1* | 5/2013 | Shechtman et al. | 382/286 |

OTHER PUBLICATIONS

Tie Liu, Zejian Yuan, Jian Sun, Jingdong Wang, Nanning Zheng, Xiaoou Tang, and Heung-Yeung Shum, "Learning to Detect a Salient Object", IEEE, Transactions on Pattern Analysis and Machine Intelligence, vol. 33, No. 2, Feb. 2011, pp. 353-367.*

Shoji Tanaka, Yuichi Iwadate, and Seiji Inokuchi, "A Figure Extraction Method based on the Color and Texture Contrasts of Regions", IEEE, Proceedings of International Conference on Image Analysis and Processing, 1999, pp. 12-17.*

Fredembach, Clement, Wang, Jue, and Woolfe, Geoff J. "Saliency, Visual Attention and Image Quality." 18th Color Imaging Conference Final Program and Proceedings. Nov. 8-12, 2010, San Antonio, Texas. San Antonio, TX: Society for Imaging Science and Technology, Nov. 2010: 128-133(6).

Liu, Hanto, and Heynderickx, Ingrid. "Visual Attention in Objective Image Quality Assessment: Based on Eye-Tracking Data." IEEE Transactions on Circuits and Systems for Video Technology 21.7 (Jul. 2011): 971-982.

Judd, Tilke, Krista Ehinger, Fredo Durand, and Antonio Torralba. "Learning to Predict Where Humans Look." 2009 IEEE 12th International Conference on Computer Vision (ICCV), Sep. 27-Oct. 4, 2009, Kyoto, Japan. IEEE, 2009: 2106-2113.

Thurstone, L.L. "A Law of Comparative Judgment." Psychological Review. 101.2 (1994): 266-270.

* cited by examiner

METHOD, APPARATUS AND SYSTEM FOR DETERMINING A SALIENCY MAP FOR AN INPUT IMAGE

CROSS-REFERENCE TO RELATED PATENT APPLICATIONS

This application claims the right of priority under 35 U.S.C. §119 based on Australian Patent Application No. 2011254040, filed 14 Dec. 2011, which is incorporated by reference herein in its entirety as if fully set forth herein.

FIELD OF INVENTION

The present invention relates to digital image processing and, in particular, to predicting salient regions in images. The present invention also relates to a method, apparatus and system for determining a saliency map for an input image. The present invention also relates to a computer program product including a computer readable medium having recorded thereon a computer program for determining a saliency map for an input image.

DESCRIPTION OF BACKGROUND ART

Predicting where people look when presented with a visual stimulus is difficult. In fact, prediction (or determination) of where people look is a necessary precursor to a variety of algorithms such as automatic cropping, image enhancement, distractor attenuation, or measuring effectiveness of advertising.

An observer's response to a (visual) stimulus can be decomposed into two parts: a low-level, stimulus-induced, response that is task-independent, and a task specific, cognitively controlled response employing higher order features. The low-level vision aspect is saliency, while the high-level aspect is called visual attention.

In recent times, models for predicting saliency can broadly be decomposed into two classes: physiological or machine learning. The class distinction notwithstanding, the general framework of the known saliency prediction techniques is to determine a model and apply the model to an input image in order to predict the saliency of the input image model is typically image independent.

The physiological class of saliency prediction algorithms generally starts with a biologically plausible architecture where low-level features are combined in order to identify elements of an image that are likely to be salient. In some known methods of predicting saliency of an image, the image is analysed with respect to features including colour (e.g., red-green and blue-yellow hue lines), luminance, and texture orientation (e.g., using Gabor filters). The feature analysis is performed over three scales, to take into account foveated vision. The outcome of the feature extraction is then hierarchised according to a principle of excitation-inhibition. Once a particular part of the human visual system is excited, that particular part then becomes inhibited for a short period of time. The inhibition allows the human visual system to concentrate on different stimuli. While such a biologically plausible architecture is indeed modelled on the physiology of the human visual system, implementation of the architecture assumes that the distance measure used in the computation of saliency is unique and applicable to all stimuli.

Variations on the above described physiological class of saliency determination algorithms have been proposed and can deliver accurate results when a single object is present over a background. Such algorithms can also deliver accurate results when the object is sufficiently distinct from its background in terms of Lab colour space values. However, such methods do not work well on more complex images.

A more recent method of deterministic saliency prediction recognises that the dimensionality of saliency prediction reaches beyond simple features often employed. The method takes into account known visual effects such as induction, also known as simultaneous colour contrast, on perceived saliency. In particular, the method effectively modifies a colour distance function and takes into account influence of image content on saliency. The method is limited by an extremely large number of phenomena of "optical illusion" related to human perception.

Another method of predicting saliency is to employ machine learning techniques to select and weight image features. The combination of image features is not chosen a priori, but rather inferred from a ground truth of human observations. High-level and low-level features (e.g., face detection, colour, luminance, horizon line) are selected, and using eye tracking data over twelve thousand (12,000) images, classifies the features and their optimal combination with a linear support vector machine (SVM). In a slightly different method, the reliability of various (unspecified) image features over user-input data with conditional random fields is measured to produce a probabilistic salient map.

While machine learning methods take into account the aspect of human observation, calculations are performed on a large-scale and aim for a silver bullet formula/feature combination that best defines saliency. However, because of the large number of dimensions of the problem, such methods are unreliable over a variety of images.

SUMMARY OF THE INVENTION

It is an object of the present invention to substantially overcome, or at least ameliorate, one or more disadvantages of existing arrangements.

According to one aspect of the present invention there is provided a method of determining a saliency map for an input image, said method comprising:

accessing pre-determined data defining relative salience of image features;

decomposing the input image according to the predetermined data to identify features of the input image corresponding to the image features in the predetermined data;

selecting a portion of the predetermined data corresponding to a range of the identified image features;

determining a perceptual scale using the selected portion of the predetermined data; and determining the saliency map for the input image using the determined perceptual scale.

According to another aspect of the present invention there is provided an apparatus for determining a saliency map for an input image, said apparatus comprising:

means for accessing pre-determined data defining relative salience of image features;

means for decomposing the input image according to the predetermined data to identify features of the input image corresponding to the image features in the predetermined data;

means for selecting a portion of the predetermined data corresponding to a range of the identified image features;

means for determining a perceptual scale using the selected portion of the predetermined data; and means for determining the saliency map for the input image using the determined perceptual scale.

According to still another aspect of the present invention there is provided a system for determining a saliency map for an input image, said system comprising:

a memory for storing data and a computer program;

a processor coupled to said memory for executing said computer program, said computer program comprising instructions for:

accessing pre-determined data defining relative salience of image features;

decomposing the input image according to the predetermined data to identify features of the input image corresponding to the image features in the predetermined data;

selecting a portion of the predetermined data corresponding to a range of the identified image features;

determining a perceptual scale using the selected portion of the predetermined data; and determining the saliency map for the input image using the determined perceptual scale.

According to still another aspect of the present invention there is provided a computer readable medium having a computer program stored thereon for determining a saliency map for an input image, said program comprising:

code for accessing pre-determined data defining relative salience of image features;

code for decomposing the input image according to the predetermined data to identify features of the input image corresponding to the image features in the predetermined data;

code for selecting a portion of the predetermined data corresponding to a range of the identified image features;

code for determining a perceptual scale using the selected portion of the predetermined data; and code for determining the saliency map for the input image using the determined perceptual scale.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
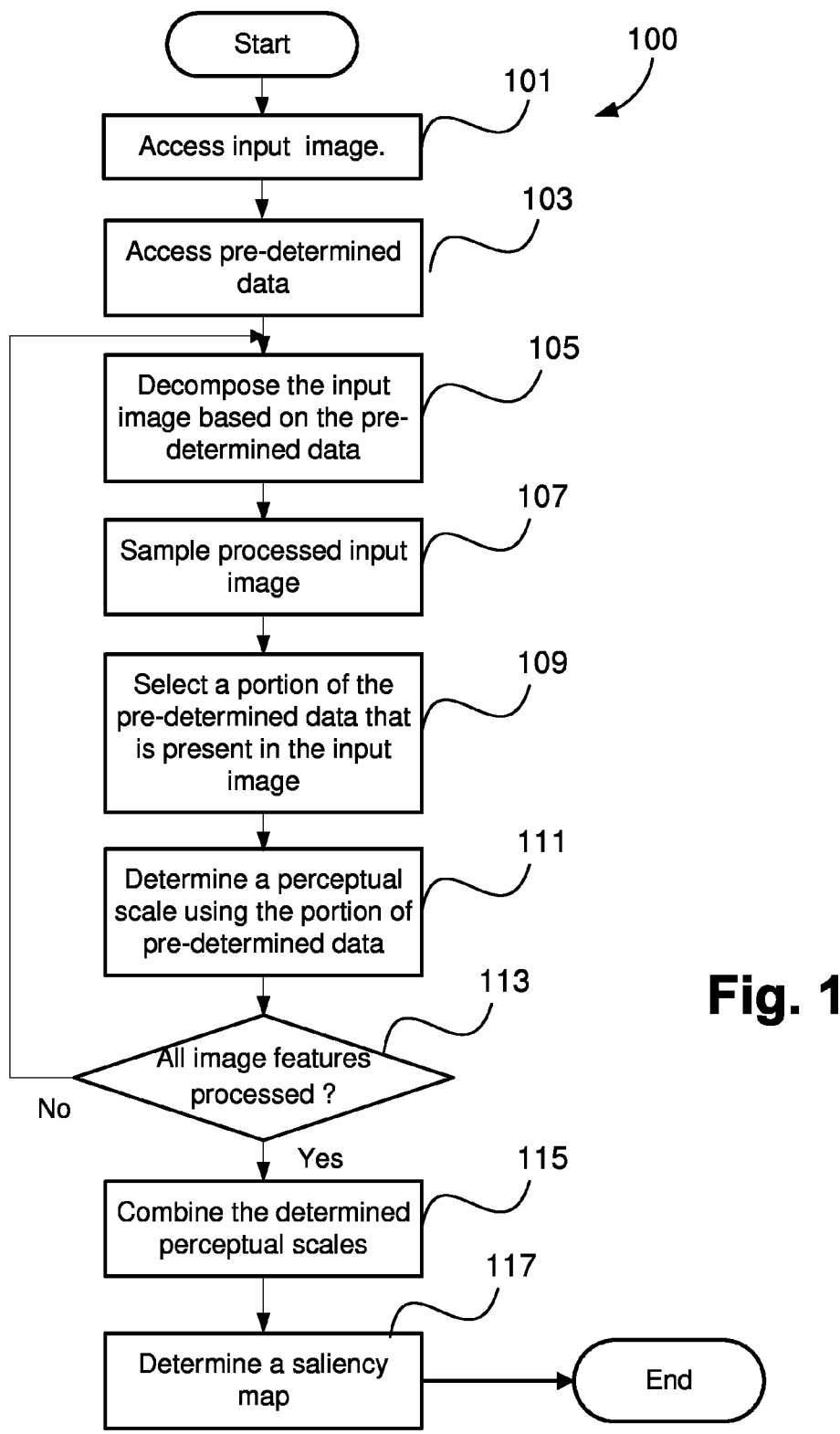
FIG. 1 is a schematic block diagram of a method of determining saliency for an image.

Where reference is made in any one or more of the accompanying drawings to steps and/or features, which have the same reference numerals, those steps and/or features have for the purposes of this description the same function(s) or operation(s), unless the contrary intention appears. Low-level vision may be defined as a difference detector having dimensions including brightness, colour and high-frequencies (e.g., sharp vs. blur as well as texture orientation). The dimensions of the difference detector may also include size and proximity because of the functioning of foveated vision. Given features that mimic, with reasonable accuracy, human visual system responses, relative "attention grabbing" potential may be modelled.

Human brain circuitry is not yet well understood, and simple rules and features are riddled with exceptions. Such exceptions, often known as optical illusions, make a simple deterministic model untractable since in addition to being numerous, optical illusions are far from understood. Furthermore, more and more optical illusions are discovered every year. Such exceptions are problematic for any computer-implemented method of predicting saliency since the influence the exceptions can have on saliency cannot be predicted from pixel values of an image alone. Examples of such optical illusions are induction phenomenon and Mach bands.

One aspect of saliency of an image is the very high correlation (agreement) among observers. One predictor as to what part of an image a person looks at is what parts of the image have been looked at by other people. Common issues of existing saliency determination methods are the "one size fits all" approach taken by the methods. That is, the same formula/model is used regardless of content of the image. Such a naive architecture is necessary with the existing saliency determination methods due to the high complexity of salience mechanisms used with the methods. However, because of such complexity, relationship between similar stimuli varies depending on surrounding content.

FIG. 1 is a schematic block diagram showing a method 100 of determining a saliency map for an input image. The method 100 predicts saliency using experimental psychophysical data and builds a specific perceptual saliency map for the input image. The determined saliency map represents a prediction of where a person will look when presented with the input image. The method 100 may be implemented using a general-purpose computer system 400, as shown in FIGS. 4A and 4B.

Figure 4A:
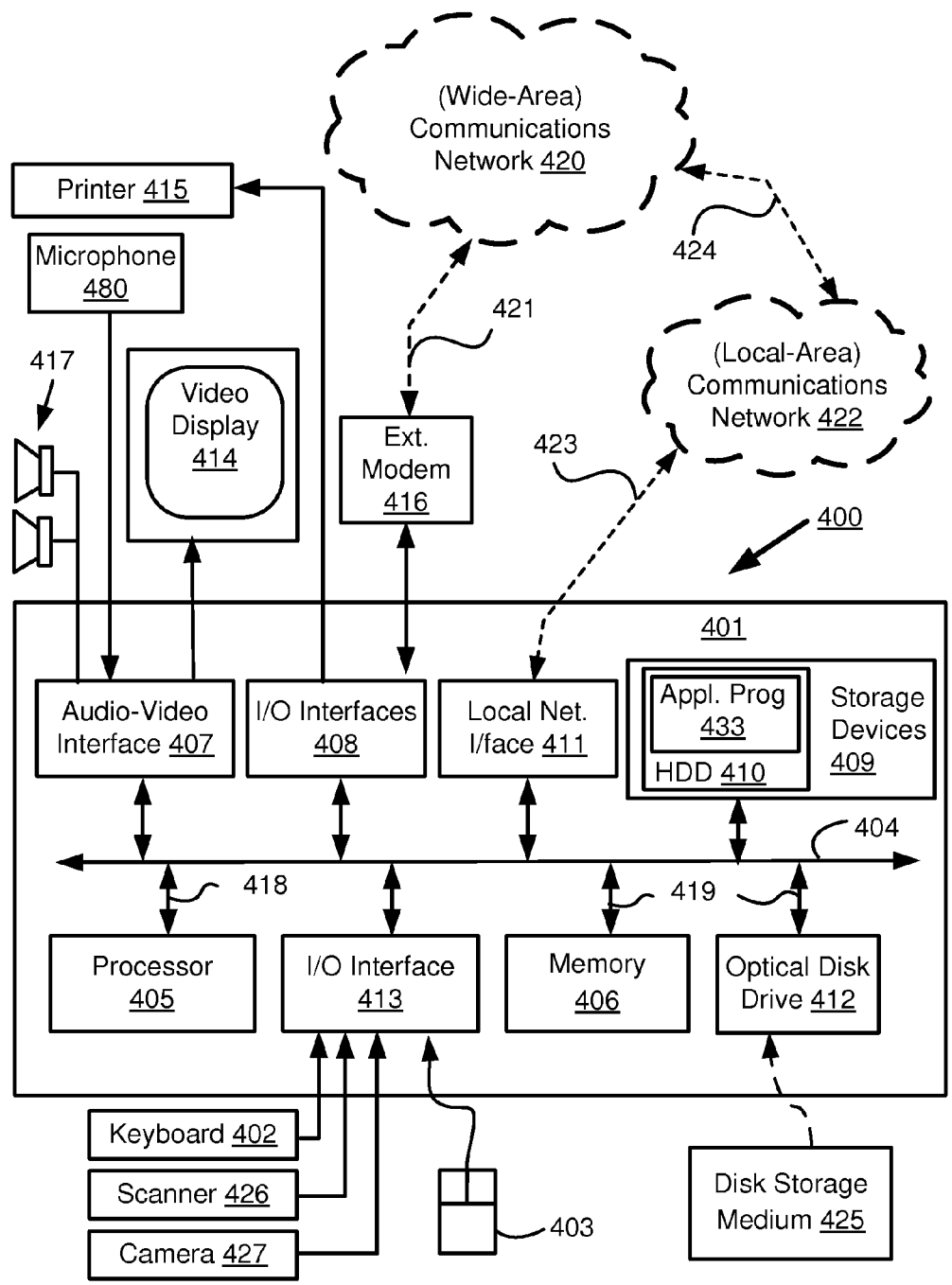
FIGS. 4A and 4B form a schematic block diagram of a general purpose computer system upon which arrangements described can be practiced.
Figure 4B:
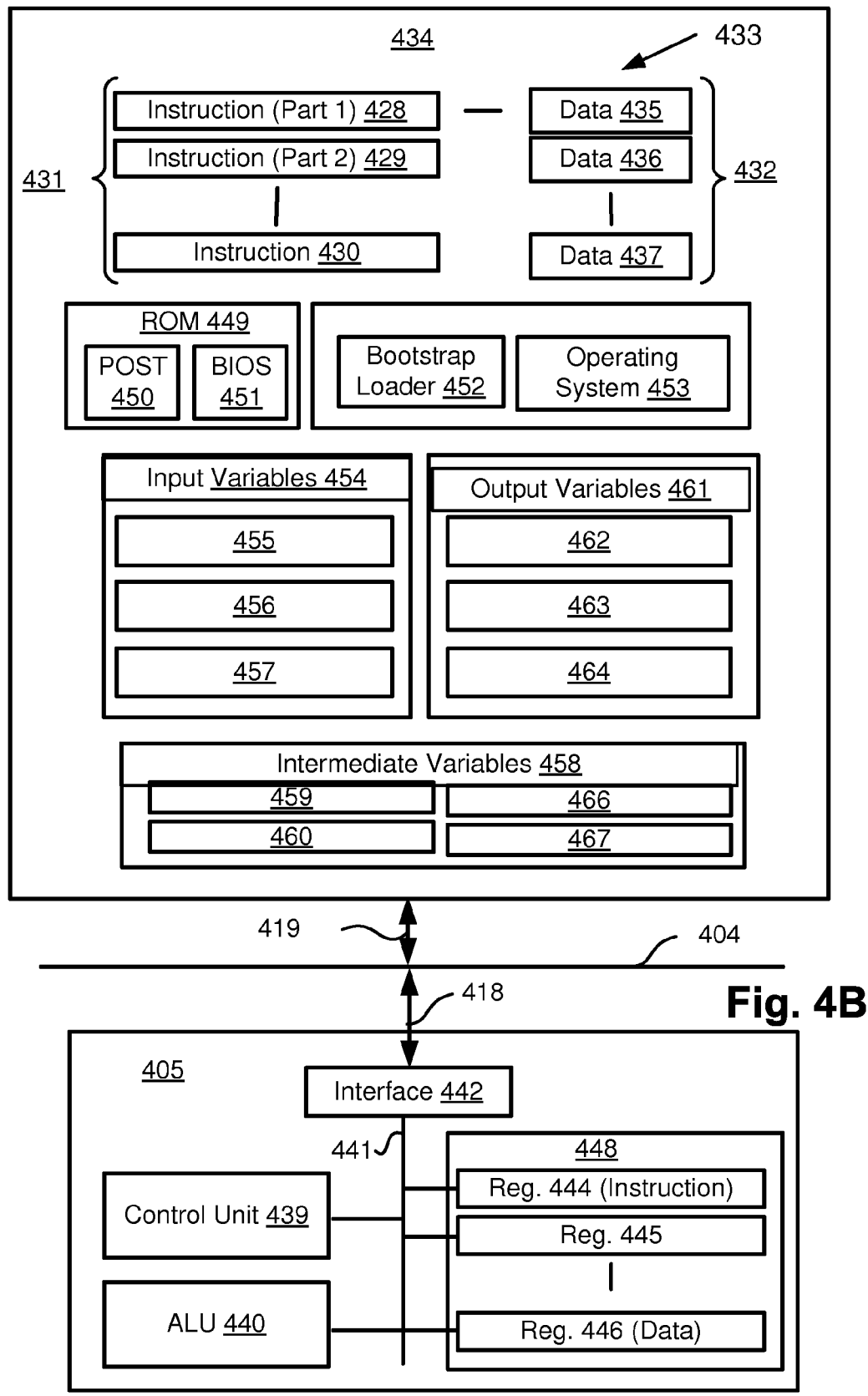

As seen in FIG. 4A, the computer system 400 includes: a computer module 401; input devices such as a keyboard 402, a mouse pointer device 403, a scanner 426, a camera 427, and a microphone 480; and output devices including a printer 415, a display device 414 and loudspeakers 417. An external Modulator-Demodulator (Modem) transceiver device 416 may be used by the computer module 401 for communicating to and from a communications network 420 via a connection 421. The communications network 420 may be a wide-area network (WAN), such as the Internet, a cellular telecommunications network, or a private WAN. Where the connection 421 is a telephone line, the modem 416 may be a traditional "dial-up" modem. Alternatively, where the connection 421 is a high capacity (e.g., cable) connection, the modem 416 may be a broadband modem. A wireless modem may also be used for wireless connection to the communications network 420.

The computer module 401 typically includes at least one processor unit 405, and a memory unit 406. For example, the memory unit 406 may have semiconductor random access memory (RAM) and semiconductor read only memory (ROM). The computer module 401 also includes an number of input/output (I/O) interfaces including: an audio-video interface 407 that couples to the video display 414, loudspeakers 417 and microphone 480; an I/O interface 413 that couples to the keyboard 402, mouse 403, scanner 426, camera 427 and optionally a joystick or other human interface device (not illustrated); and an interface 408 for the external modem 416 and printer 415. In some implementations, the modem 416 may be incorporated within the computer module 401, for example within the interface 408. The computer module 401 also has a local network interface 411, which permits coupling of the computer system 400 via a connection 423 to a local-area communications network 422, known as a Local Area Network (LAN). As illustrated in FIG. 4A, the local communications network 422 may also couple to the wide network 420 via a connection 424, which would typically include a so-called "firewall" device or device of similar functionality. The local network interface 411 may comprise an Ethernet™ circuit card, a Bluetooth™ wireless arrangement or an IEEE 802.11 wireless arrangement; however, numerous other types of interfaces may be practiced for the interface 411.

The I/O interfaces 408 and 413 may afford either or both of serial and parallel connectivity, the former typically being implemented according to the Universal Serial Bus (USB) standards and having corresponding USB connectors (not illustrated). Storage devices 409 are provided and typically include a hard disk drive (HDD) 44. Other storage devices such as a floppy disk drive and a magnetic tape drive (not illustrated) may also be used. An optical disk drive 412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 400.

The components 405 to 413 of the computer module 401 typically communicate via an interconnected bus 404 and in a manner that results in a conventional mode of operation of the computer system 400 known to those in the relevant art. For example, the processor 405 is coupled to the system bus 404 using a connection 418. Likewise, the memory 406 and optical disk drive 412 are coupled to the system bus 404 by connections 419. Examples of computers on which the described arrangements can be practised include IBM-PC's and compatibles, Sun Sparcstations, Apple Mac™ or alike computer systems.

The method 100 may be implemented using the computer system 400 wherein the processes of FIGS. 1 to 9, to be described, may be implemented as one or more software application programs 433 executable within the computer system 400. In particular, the steps of the method 100 are effected by instructions 431 (see FIG. 4B) in the software 433 that are carried out within the computer system 400. The software instructions 431 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. The software 433 is typically stored in the HDD 410 or the memory 406. A computer readable medium having such software or computer program recorded on the computer readable medium is a computer program product. The use of the computer program product in the computer system 400 preferably effects an advantageous apparatus for implementing the described methods.

In some instances, the application programs 433 may be supplied to the user encoded on one or more CD-ROMs 425 and read via the corresponding drive 412, or alternatively may be read by the user from the networks 420 or 422. Still further, the software can also be loaded into the computer system 400 from other computer readable media. Computer readable storage media refers to any non-transitory tangible storage medium that provides recorded instructions and/or data to the computer system 400 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 401. Examples of transitory or non-tangible computer readable transmission media that may also participate in the provision of software, application programs, instructions and/or data to the computer module 401 include radio or infra-red transmission channels as well as a network connection to another computer or networked device, and the Internet or Intranets including e-mail transmissions and information recorded on Websites and the like.

The second part of the application programs 433 and the corresponding code modules mentioned above may be executed to implement one or more graphical user interfaces (GUIs) to be rendered or otherwise represented upon the display 414. Through manipulation of typically the keyboard 402 and the mouse 403, a user of the computer system 400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 417 and user voice commands input via the microphone 480.

FIG. 4B is a detailed schematic block diagram of the processor 405 and a "memory" 434. The memory 434 represents a logical aggregation of all the memory modules (including the HDD 409 and semiconductor memory 406) that can be accessed by the computer module 401 in FIG. 4A.

When the computer module 401 is initially powered up, a power-on self-test (POST) program 450 executes. The POST program 450 is typically stored in a ROM 449 of the semiconductor memory 406 of FIG. 4A. A hardware device such as the ROM 449 storing software is sometimes referred to as firmware. The POST program 450 examines hardware within the computer module 401 to ensure proper functioning and typically checks the processor 405, the memory 434 (409, 406), and a basic input-output systems software (BIOS)module 451, also typically stored in the ROM 449, for correct operation. Once the POST program 450 has run successfully, the BIOS 451 activates the hard disk drive 410 of FIG. 4A. Activation of the hard disk drive 410 causes a bootstrap loader program 452 that is resident on the hard disk drive 410 to execute via the processor 405. This loads an operating system 453 into the RAM memory 406, upon which the operating system 453 commences operation. The operating system 453 is a system level application, executable by the processor 405, to fulfil various high level functions, including processor management, memory management, device management, storage management, software application interface, and generic user interface.

The operating system 453 manages the memory 434 (409, 406) to ensure that each process or application running on the computer module 401 has sufficient memory in which to execute without colliding with memory allocated to another process. Furthermore, the different types of memory available in the system 400 of FIG. 4A must be used properly so that each process can run effectively. Accordingly, the aggregated memory 434 is not intended to illustrate how particular segments of memory are allocated (unless otherwise stated), but rather to provide a general view of the memory accessible by the computer system 400 and how such is used.

As shown in FIG. 4B, the processor 405 includes a number of functional modules including a control unit 439, an arithmetic logic unit (ALU) 440, and a local or internal memory 448, sometimes called a cache memory. The cache memory 448 typically includes a number of storage registers 444-446 in a register section. One or more internal busses 441 functionally interconnect these functional modules. The processor 405 typically also has one or more interfaces 442 for communicating with external devices via the system bus 404, using a connection 418. The memory 434 is coupled to the bus 404 using a connection 419.

The application program 433 includes a sequence of instructions 431 that may include conditional branch and loop instructions. The program 433 may also include data 432 which is used in execution of the program 433. The instructions 431 and the data 432 are stored in memory locations 428, 429, 430 and 435, 436, 437, respectively. Depending upon the relative size of the instructions 431 and the memory locations 428-430, a particular instruction may be stored in a single memory location as depicted by the instruction shown in the memory location 430. Alternately, an instruction may be segmented into a number of parts each of which is stored in a separate memory location, as depicted by the instruction segments shown in the memory locations 428 and 429.

In general, the processor 405 is given a set of instructions which are executed therein. The processor 405 waits for a subsequent input, to which the processor 405 reacts to by executing another set of instructions. Each input may be provided from one or more of a number of sources, including data generated by one or more of the input devices 402, 403, data received from an external source across one of the networks 420, 402, data retrieved from one of the storage devices 406, 409 or data retrieved from a storage medium 425 inserted into the corresponding reader 412, all depicted in FIG. 4A. The execution of a set of the instructions may in some cases result in output of data. Execution may also involve storing data or variables to the memory 434.

The described methods use input variables 454, which are stored in the memory 434 in corresponding memory locations 455, 456, 457. The described methods produce output variables 461, which are stored in the memory 434 in corresponding memory locations 462, 463, 464. Intermediate variables 458 may be stored in memory locations 459, 460, 466 and 467.

Referring to the processor 405 of FIG. 4B, the registers 444, 445, 446, the arithmetic logic unit (ALU) 440, and the control unit 439 work together to perform sequences of micro-operations needed to perform "fetch, decode, and execute" cycles for every instruction in the instruction set making up the program 433. Each fetch, decode, and execute cycle comprises:

(a) a fetch operation, which fetches or reads an instruction 431 from a memory location 428, 429, 430;

(b) a decode operation in which the control unit 439 determines which instruction has been fetched; and (c) an execute operation in which the control unit 439 and/or the ALU 440 execute the instruction.

Thereafter, a further fetch, decode, and execute cycle for the next instruction may be executed. Similarly, a store cycle may be performed by which the control unit 439 stores or writes a value to a memory location 432.

Each step or sub-process in the processes of FIGS. 1 to 3 and 5 to 9 is associated with one or more segments of the program 433 and is performed by the register section 444, 445, 447, the ALU 440, and the control unit 439 in the processor 405 working together to perform the fetch, decode, and execute cycles for every instruction in the instruction set for the noted segments of the program 433.

The described methods may alternatively be implemented in dedicated hardware such as one or more integrated circuits performing the functions or sub functions of the methods. Such dedicated hardware may include graphic processors, digital signal processors, or one or more microprocessors and associated memories.

The method 100 begins at image accessing step 101, where the processor 405 is used to access an input image stored in the memory 406 and/or the hard disk drive 410. The input image may be captured either via an image capture device, such as the camera 427 or the like. For example, the input image may be captured using the camera 427. The input image may then be downloaded from the camera 427 to the computer module 401 and stored within the memory 406 and/or the hard disk drive 410 as data values. Alternatively, the input image may be downloaded to the computer module 401, via the network 420, from a remote server or the like.

In addition to the input image, in the method 100 the processor 405 is used at data accessing step 103 to access pre-determined data stored within the memory 406 and/or the hard disk drive 410. The predetermined data may have been obtained through direct psychophysical experimentation, as will be described in detail below with reference to FIG. 5, before being stored within the memory 406 and/or hard disk drive 410. The predetermined data represents saliency observations and is configured for defining relative salience of image features. In particular, the pre-determined data describes multiple image features that may be correlated with human perception of saliency. Such features include, for example, colour, brightness, luminance, texture, sharpness and orientation. Other, higher level features such as face detection may also be described by the pre-determined data.

At image decomposition step 105, the processor 405 is used for processing the input image in order for the input image to exhibit the same features as features represented by the pre-determined data. The processing at step 105 comprises decomposing the input image according to the pre-determined data to identify a feature of the input image corresponding to an image feature in the predetermined data. For example, if the pre-determined data contain data about luminance, as calculated by the L channel of the CIE Lab colour space, then at step 105 the processor 405 extracts the L channel feature of the input image for further analysis.

Other considerations may impact the decomposing of the image at step 105. For example, when a specific photo-space or camera capture mode is used to capture the input image, some of the image features of the input image may be discarded prior to step 105.

As described below with reference to FIGS. 6A to 6C, at step 105, the processor 405 is used for determining feature values corresponding to the identified feature for each element of the input image. In one arrangement, the feature values may be in the form of triplets including values for brightness, colour and sharpness. The processed input image may be stored within memory 406 at step 105.

The pre-determined data stored within the memory 406 and/or hard disk drive 410 may be sparse due to the means of acquisition and storage of the data or due to processing efficiency concerns. At feature sampling step 107, the processor 405 is used to sample the processed input image in order to reduce the complexity of the image feature identified at step 105. In particular, the complexity of the identified image feature is reduced to make the identified image feature comparable with corresponding feature represented by the pre-determined data. For example, the pre-determined data may only contain values of luminance L sampled every five (5) units from 0 to one hundred (100) (i.e., 0, 5, 10, 15, . . . , 100) whereas the L feature of the input image may exhibit values of L with a precision of one (1) unit. At step 107, the processor 405 rounds the feature values of the image feature determined in step 105 to have the same precision as corresponding feature values in the pre-determined data.

Once the identified image feature of the input image has been sampled, at sub-data selection step 109, the processor 405 is used for selecting a portion of the pre-determined data that is present in the input image for the identified feature. The selected portion of predetermined data may be referred to as "sub-data". As described in detail below, portions (or sub-data) of pre-determined data corresponding to a range of identified features in the input image are determined in accordance with the method 100.

As will be described in more detail below with reference to FIGS. 3A to 3C, each feature present in the predetermined data accessed at step 103 may be represented by an N×N matrix M, where N represents the number of samples of an image feature. In one arrangement, where L is sampled every five (5) units from 0 to 100, N=21. In the matrix M, an element Mij represents the number of times stimulus i is deemed more salient than stimulus j in the creation of the predetermined data which will be described in more detail below with reference to FIG. 5. The matrix M is a representation of the influence of a particular feature on saliency averaged over all possible observations.

If saliency of a feature depends on intrinsic values of that feature only, then the matrix M contains information needed to predict saliency based on that feature. However, saliency behaviour is complex, and image dependency needs to be taken into account. Saliency complexity may be illustrated in the case of colour. As an example, saliency of five-hundred and sixty-five (565) isoluminant colours may be measured, generating a total of 192,000 observations. In such an example, the matrix M has a size of 565×565, which implies that the maximum dimension of saliency imputed to colour for such a colour space sampling is five-hundred and sixty-five (565).

Methods such as Principal Component Analysis (PCA) may be used to determine actual dimension of colour saliency. However, using PCA, in order to describe more than 95% of variance, more than four-hundred and eighty (480) dimensions are necessary. This is similarly the case for features such as brightness and sharpness. Such high dimensionality shows that saliency is a highly image (or stimulus) dependent process, so modelling saliency with a single formula does not produce good enough results. The matrix M may be used to perform an image dependent analysis of saliency. At step 109, the processor 405 is used to generate a sub-matrix Msub, representing the selected portion of data, from the predetermined data matrix M, and store the sub-matrix in memory 406. For example, the input image may contain only four (4) distinct levels of luminance. In such an example, from the matrix M, at step 109, the processor 405 is used to create a sub-matrix Msub of size 4×4 that contains data values representing all sixteen (16) experimental observations made when the specific four (4) levels of luminance were present. Step 109 will be described in further detail below with reference to FIGS. 3A, 3B and 3C.

In perceptual scale determination step 111, the processor 405 is used for determining a perceptual scale using the portion of predetermined data selected at step 109. At step 111, the observation data values of the sub-matrix Msub are transformed into a perceptual scale comprising numbers that correlate with human perception. The perceptual scale is determined by transforming the observation data values of the sub-matrix Msub into probabilities. For example, let the sub-matrix Msub be a matrix of size K×K, an equivalent probability matrix Psub is defined in accordance with Equation (1), as follows:

$$P_{sub_{ij}} = \frac{M_{sub_{ij}}}{M_{sub_{ij}} + M_{sib_{ji}}} \quad (1)$$

for $i, j \in K.$

Z-scores may be extracted from the probability matrix Psub depending on a statistical model employed.

Any suitable method of converting probabilistic observation data values into perceptually-correlated Z-scores may be used at step 111. For example, the absolute judgment values in Psub, which have a 0% or 100% probability, may be replaced by a suitable value. In this instance, 0% may be replaced by 0.1% and 100% may be replaced by 99.9%, for example. Assuming an underlying distribution is Gaussian, although other distributions may also be used, for every element of Psub, the variable value x for which ∫erf(x) dx=Psub may be determined. For each row in Psub, an average, column-wise value of x may then be determined. Under a Normal assumption, a scale value (i.e., Z-score) may be output for each element.

The perceptual scale determined at step 111 may be stored within the memory 406.

At decision step 113, if the processor 405 determines that all of the image features in the input image that have a corresponding image feature in the predetermined data have been processed, then the method 100 proceeds to step 115. Otherwise, the method 100 returns to step 105, where the processor 405 is used to identify another feature of the input image. Another portion of the predetermined data is selected at a following iteration of step 109 and another submatrix Msub is also generated for the further selected portion of the pre-determined data. Step 111 is then repeated. Accordingly, a perceptual scale is determined for each of the sub-matrices determined for the input image.

Alternatively, the process may be accelerated by processing the image according to an analytical saliency model (e.g., setting salience as CIE ΔE), to determine an approximate saliency map. Then, the map (or a portion thereof) can be refined according to the sub-data.

Then at perceptual scale combination step 115, the processor 405 is used to combine the various perceptual scales created at the perceptual scale creation step 111 into a single perceptual scale which may be stored within the memory 406. In one arrangement, the perceptual scale that has a largest spread or highest value is selected to form the single perceptual scale at step 115. For example, the scale with the largest spread may be given a weight of one (1) and all of the other scales may be given a weight of zero (0).

In another arrangement, the perceptual scales determined at each iteration of step 111 may be summed in order to determine the single perceptual scale at step 115. Each image region (or pixel) represented by the predetermined data may have one Z-score per feature represented by the image region. Summing over all of the features allows the saliency of each image region (or pixel) to be determined. In still another arrangement, a weighted linear combination may be used to determine the single perceptual scale at step 115, for example by considering luminance Z-score to be twice as important as colour (the weighted average becomes (2*brightness+colour+sharpness/4)).

The method 100 concludes at saliency map determination step 117, where the processor 405 is used for determining a saliency map for the input image using the perceptual scale determined at step 115. The perceptual scale determined at step 115 is combined with the input image in order to determine the saliency map which may be stored within the memory 406. The saliency map at step 117 may be one where every pixel of the input image is assigned a probability of being salient based on a Gaussian interpretation of a Z-score value determined for the pixel. For example, a Z-score of +3 for a pixel may represent a 99% chance of the pixel being salient, while a Z-score of −3 represent a 1% chance of the pixel being salient.

Depending on how the input image is captured, the saliency map determined at step 117 may be normalised or thresholded. For example, all pixels with a probability of being salient of less than 75% may be deemed not salient.

Figure 2A:
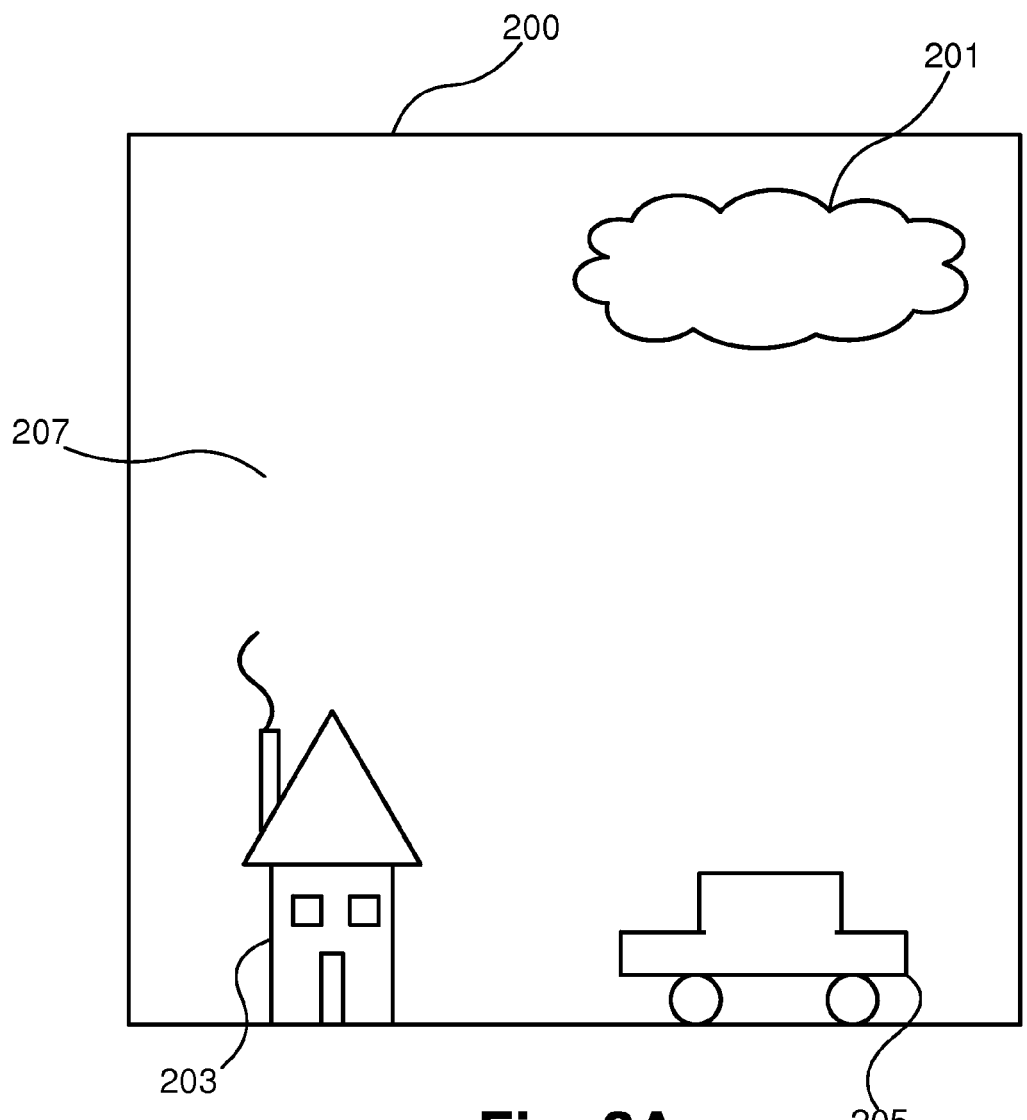
FIG. 2A shows an example input image.
Figure 2B:
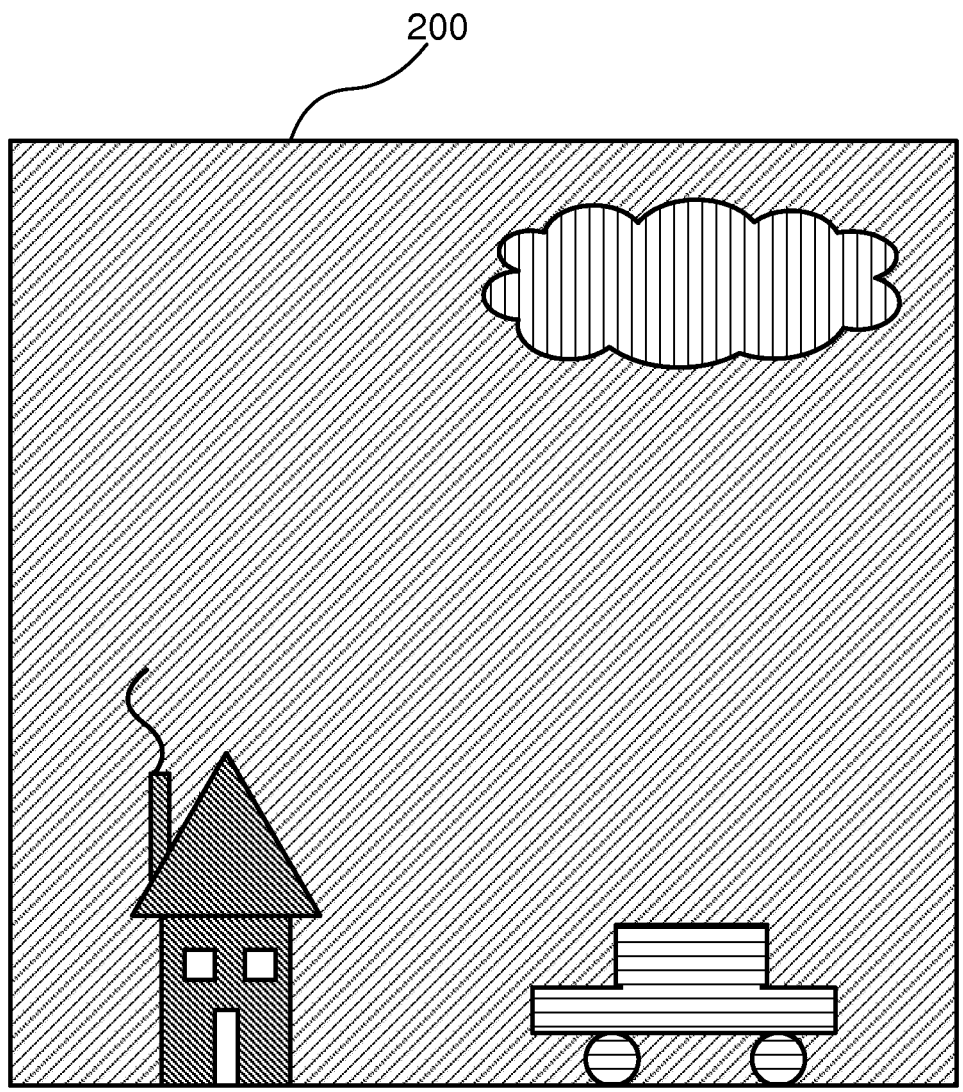
FIG. 2B shows the input image of FIG. 2A segmented into regions.
Figure 2C:
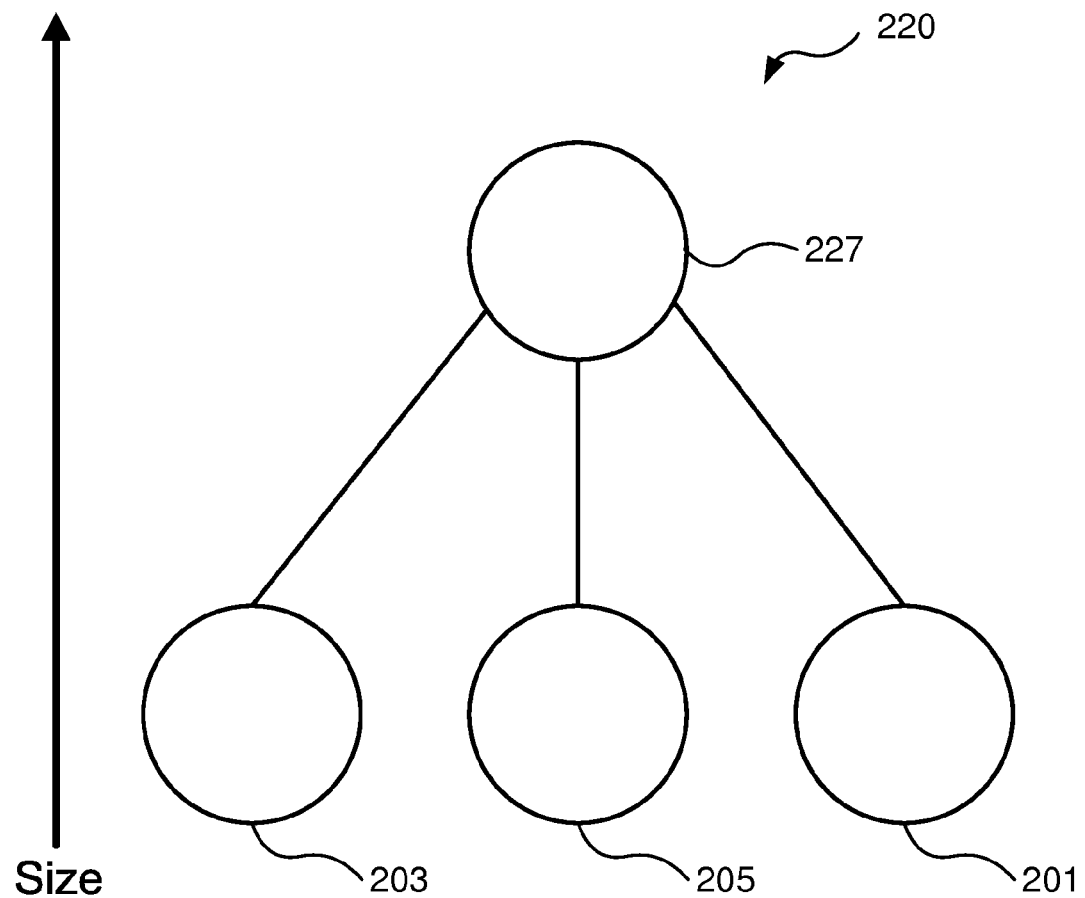
FIG. 2C shows a relational tree diagram.

In one arrangement, a relational tree diagram 220, as seen in FIG. 2C, may be used at step 105 to identify features of the input image corresponding to the image features in the predetermined data. For example, FIG. 2A shows an input image 200 composed of four image elements including a cloud 201, a house 203, a car 205 and a background 207. The image 200 may be segmented, as shown in FIG. 2B, in order to identify the image elements 201, 203, 205 and 207 as regions, where the regions are represented as various line orientations in FIG. 2B.

Since the perceived saliency of an image element may depend on the background that the image element is being cast against, the relational diagram 220 shown in FIG. 2C, may be used to determine saliency for the image 200. The relational tree diagram 220 shows adjacency, as represented by lines (e.g., 230), between the segmented regions of FIG. 2B. Larger objects within the image 200 are placed closer to a root of the relational tree diagram 220 since in terms of saliency, smaller image elements will be considered salient, since larger image elements will be perceived as background.

In the example of FIGS. 2A to 2C, the segmented background region 207 is at the top of the tree 200 and the cloud 201, car 205 and house 203 are all cast against the background region 207. For the saliency determination method 100, the relational tree diagram 220 may be used to determine that the saliency of image regions 201, 203 and 205 represented by child nodes of the relational diagram 220 where saliency of the image region 201 represented by parent nodes of the tree 220 may be discarded.

Accordingly, in implementing the step 105 for the example input image 200, the image 200 is segmented into regions as shown in FIG. 2B. Relationships between the regions of the image 200 may then be determined using, for example, a graph adjacency model and a relational model, such as the relation tree diagram 220 is built. An input image that has been decomposed and sampled according to steps 105 and 107 may be combined with the predetermined data to select the portion of the predetermined data that is present in the input image, as at step 109. The selected portion of the predetermined data may be referred to as "sub-data".

Figure 3A:
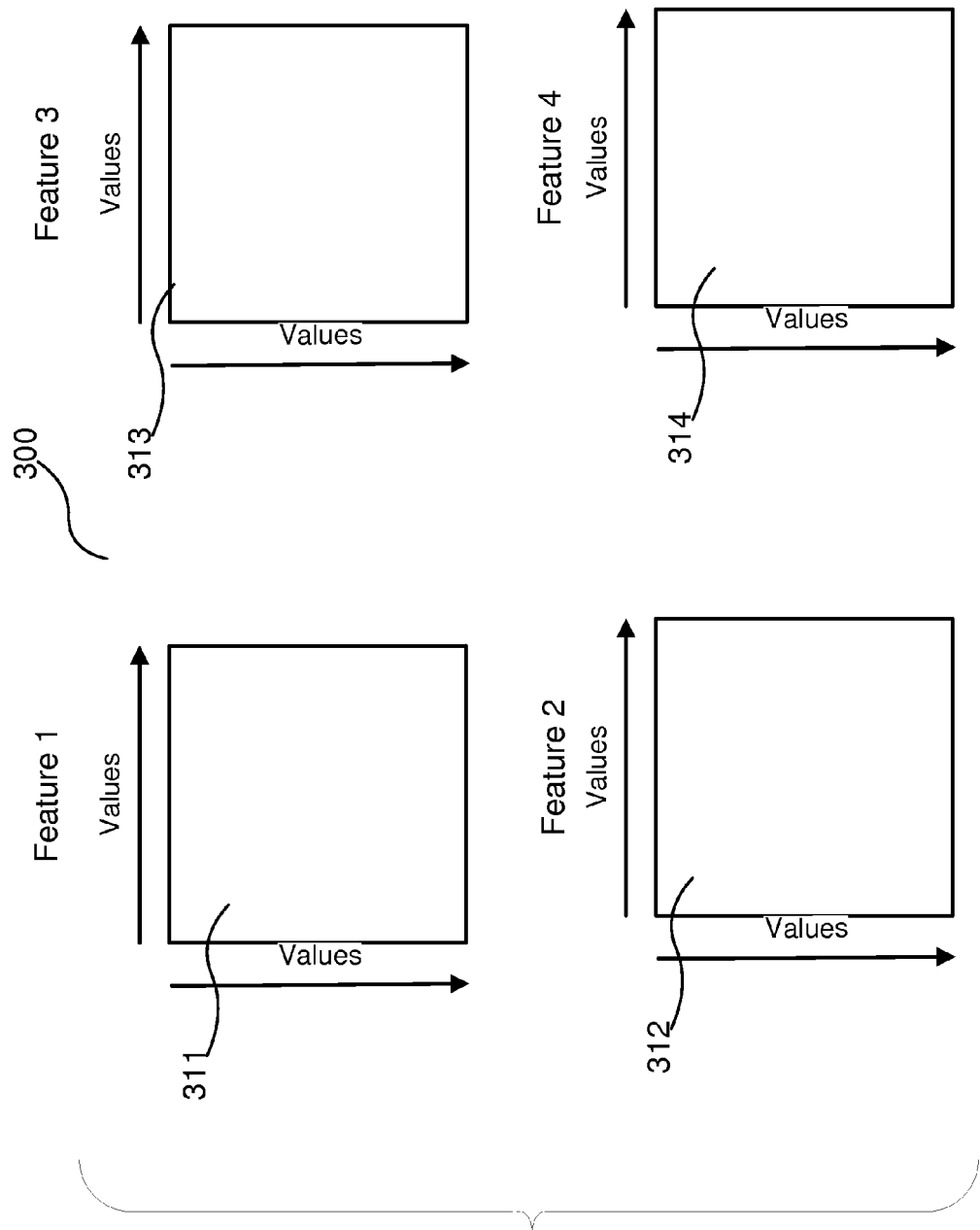
FIG. 3A is a schematic representation showing pre-determined data.

FIG. 3A shows a schematic representation of pre-determined data 300 in matrix or table form. In the example of FIG. 3A there are four features (i.e., Feature 1, Feature 2, Feature 3 and Feature 4) in the predetermined data 300, each of the four features comprising a potentially different range and sample density of feature data values.

As represented in FIG. 3A, each of the four features populates a matrix 311, 312, 313 and 314, respectively. In the example of FIG. 3A, cells of the matrices 311, 312, 313 and 314 represent saliency-related data, such as can be obtained with psychophysical experimentation.

Figure 3B:
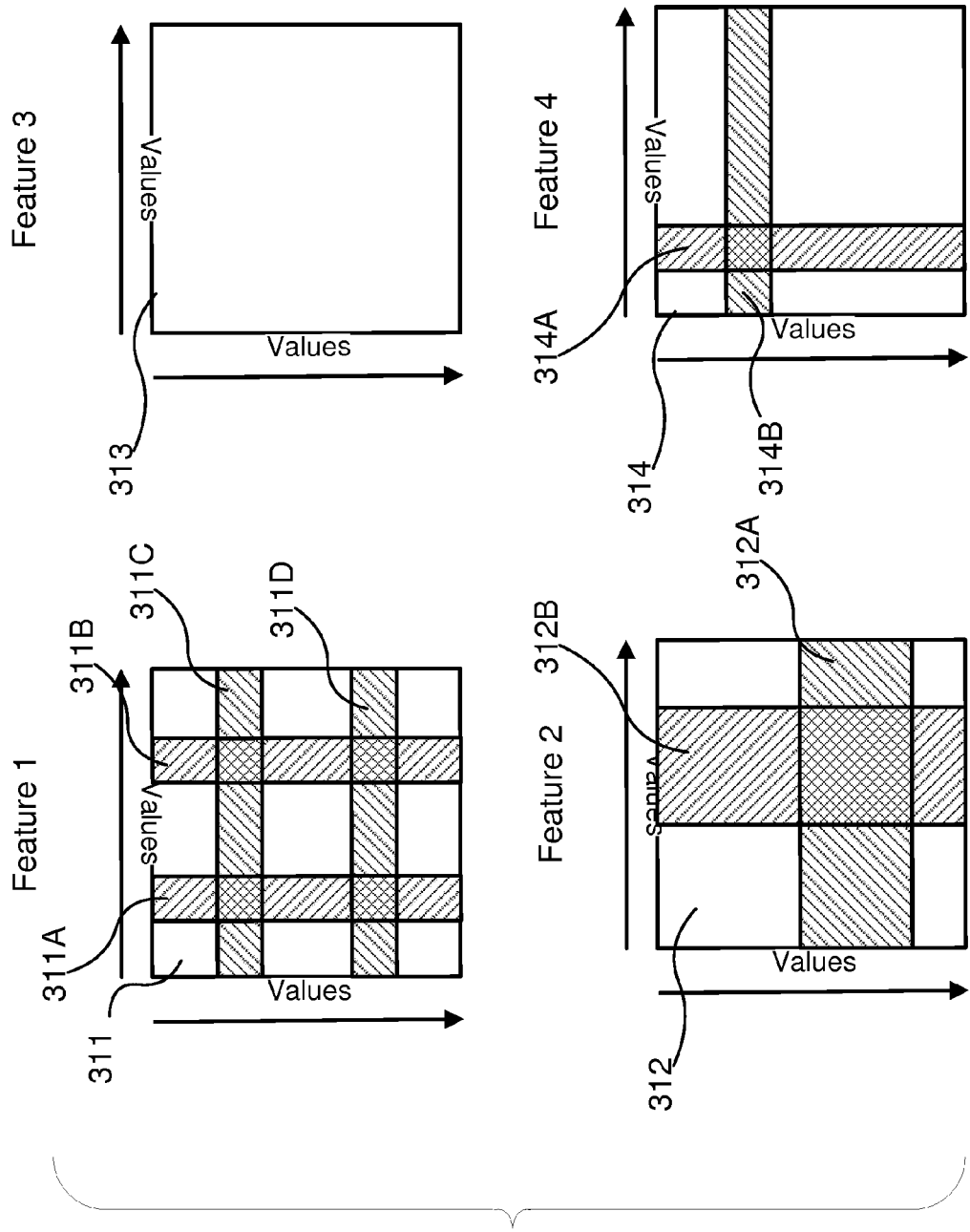
FIG. 3B shows shaded areas corresponding to a range of values that are present for features in an input image.

FIG. 3B will be used to illustrate interaction of an input image and the predetermined data 300 at step 109. At step 109, the processor 405 needs to determine which of the features of predetermined data stored in the memory 406 and/or hard disk drive 410 are present in the input image.

In accordance with the example of FIGS. 3A and 3B, the input image contains Feature 1 represented by matrix 311, Feature 2 represented by matrix 312 and Feature 4 represented by matrix 314 only. Shaded areas 311A, 311B2, 311C and 311D correspond to a range of feature data values that are present for Feature 1 in the input image. Similarly, shaded areas 312A and 312B correspond to a range of feature data values that are present for Feature 2 in the input image. Further, shaded areas 314A and 314B correspond to a range of feature data values that are present for Feature 4 in the input image.

Figure 3C:
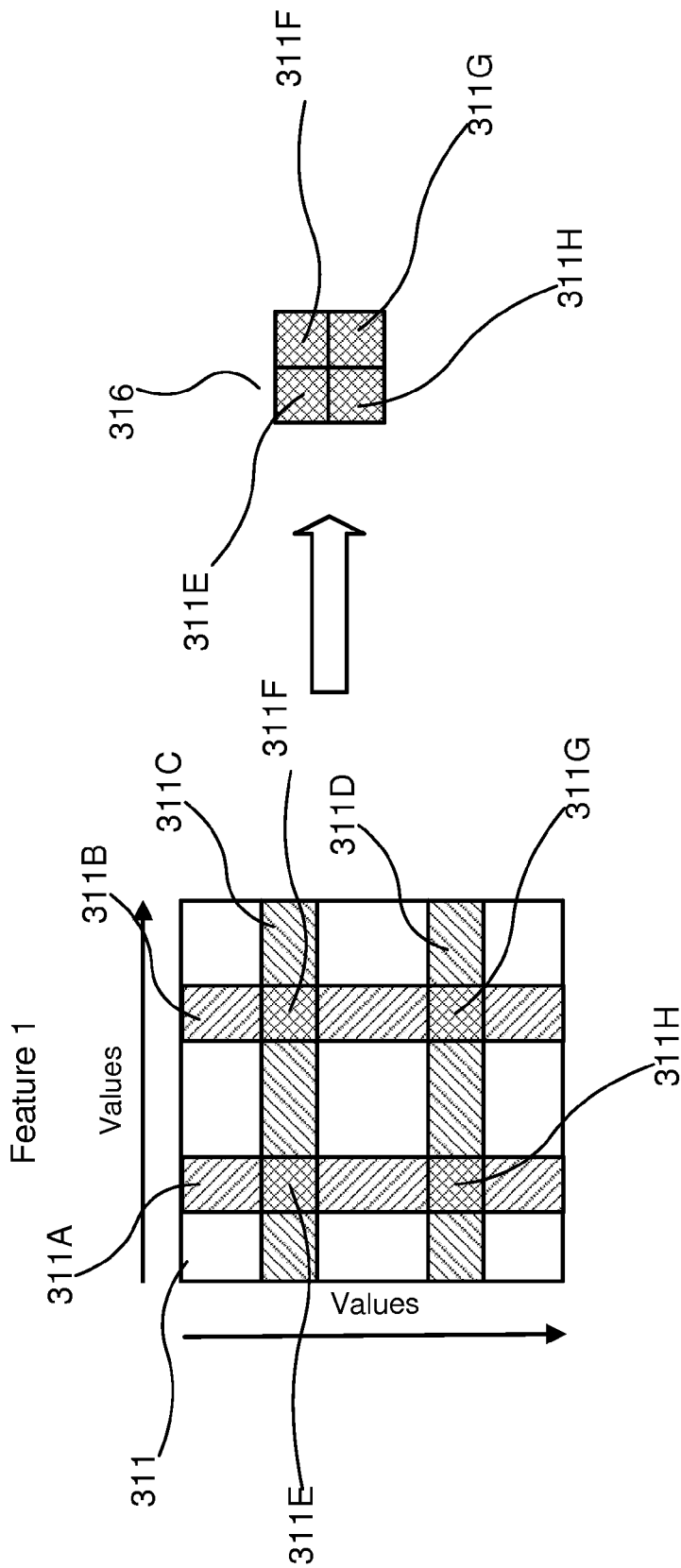
FIG. 3C shows a portion of predetermined data selected in accordance with the method of FIG. 1 for an image feature.

As shown in FIG. 3C, for Feature 1 represented by the matrix 311, intersection of the shaded areas 311A. 311B, 311C and 311D produces intersection areas 311E, 311F, 311G and 311H. The intersection areas 311E, 311F, 311G and 311H represent (feature-wise) a portion 316 of the predetermined data that is relevant to the input image and forms (feature-wise) the portion 316 of predetermined data selected in a first iteration of step 109.

Figure 3D:
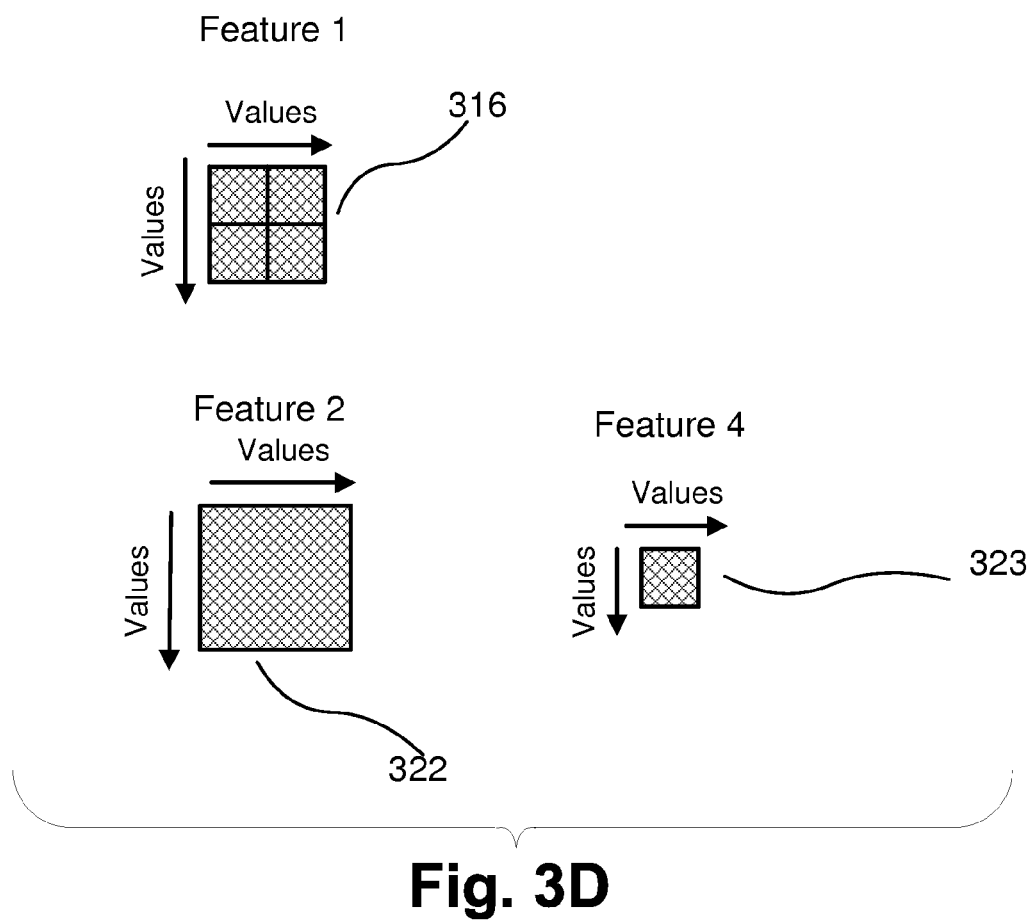
FIG. 3D shows three portions of predetermined data selected in accordance with the method of FIG. 1 for three image features, respectively.

FIG. 3D shows a portion of data (sub-data) 316, a portion of data 322 and a portion of data 323 corresponding to each of Feature 1, Feature 2 and Feature 3, respectively, which are relevant to the example input image. The portions of data 316, 322 and 323 are composed of three (3) features and the size of each of the matrices corresponding to each of the portions of data 316, 322 and 323, respectively, vary depending on content of the input image.

In one arrangement, the method 100 may be implemented as one or more software code modules resident within an image capture device, such as the camera 427, and being controlled in its execution by a processor (not shown) of the camera 427. In this instance, the saliency map for the input image may be determined in the camera 427 used to capture the input image. A real-world scene may be imaged using the camera 427 and stored within a memory of the camera 427. The captured image forms the input of the method 100 executing within the camera 427. A saliency map determined in accordance with the method 400 may be embedded or stored, for instance, as metadata or alpha-mask parameters, with the captured image. For example, the processor of the camera 427 may be used for storing the saliency map as metadata together with the input image, within a memory (not shown) of the camera 427.

In one arrangement where the method 100 is implemented within the camera 427, for example, the method 100 may process fewer features of the input image at step 105. For example, a single feature of the input image may be decomposed at step 105.

Alternatively, the method 100 may be implemented as one or more software modules stored within a printer, such as the printer 415, and may be executed by a processor (not shown) of the printer 415. In accordance with such an arrangement, a printer driver resident within the memory 406 of the computer module 101, for example, may send an input image to a printer, such as the printer 415. The input image forms the input of the method 100 executing within the printer 415. In this instance, a saliency map determined in accordance with the method 100 may be used by a printing-related saliency dependent software application or the like. For example, the printer 415 executing such a software application may be used for printing one more image elements or the like using the determined saliency map. The saliency map may be used for centring a print or rationalising ink coverage depending on saliency of content within the input image.

As described above, the method 100 may be implemented as one or more software code module of the software application program 433 resident with the hard disk drive 410 and being controlled its execution by the processor 405. In this instance, an image stored within the memory 406 and/or hard disk drive 410 may form the input of the method 100. In one arrangement, the described methods may be configured for inputting the saliency map determined in accordance with the method 100 into other software applications. For example, the saliency map may be used by a computer-based saliency dependent application program for image cropping, image compression or the like.

Figure 5:
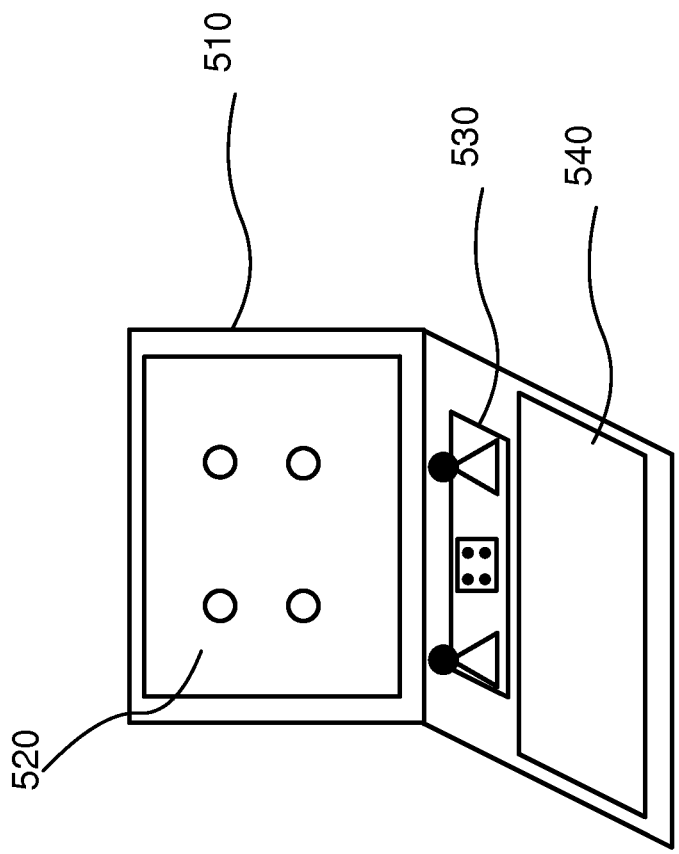
FIG. 5 is a schematic representation of an experimental setup used to collect the pre-determined data of FIG. 3A.
Figure 5:
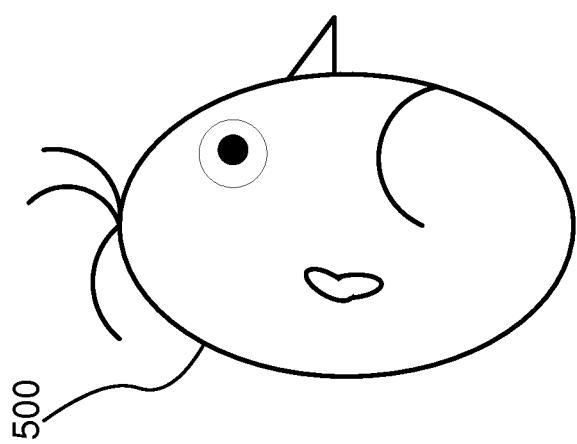

FIG. 5 is a schematic representation of an experimental setup used to collect the predetermined data accessed at step 103. Because of the potentially high dimensionality of saliency prediction, relevant features are not able to be generated a priori. Modelling complexity may be traded for experimental time, which can readily be performed offline. Experiments whose complexity is tractable, implying that feature values have to be sampled, may be used to determine the predetermined data accessed at step 103. Selecting image features that are known to be independently treated by the human visual system, such as luminance, colour, and texture allows such image features to be analysed in independent experiments. A psychophysical method of determining the predetermined data for use is the method 100 requires an observer 500, as seen in FIG. 5, to observe stimuli 520 displayed on a display device 510. The observer 500 selects a most salient part of the stimuli 520 when the observer 500 is presented with the stimuli 520. The selection of the observer 500 may be recorded by a third party using an input device 540. Alternatively, the gaze of the observer 500 when presented with the stimuli 520 may be measured using a gaze measuring device 530. The stimuli 520 may be configured to be treated as a series of forced choice paired comparisons. The force choice paired comparisons allow the predetermined data and sub-data, as described above, to be analysed with statistical models, such as the Z-score statistical model described above, to measure the saliency of stimuli in terms of Z-scores.

Figure 6A:
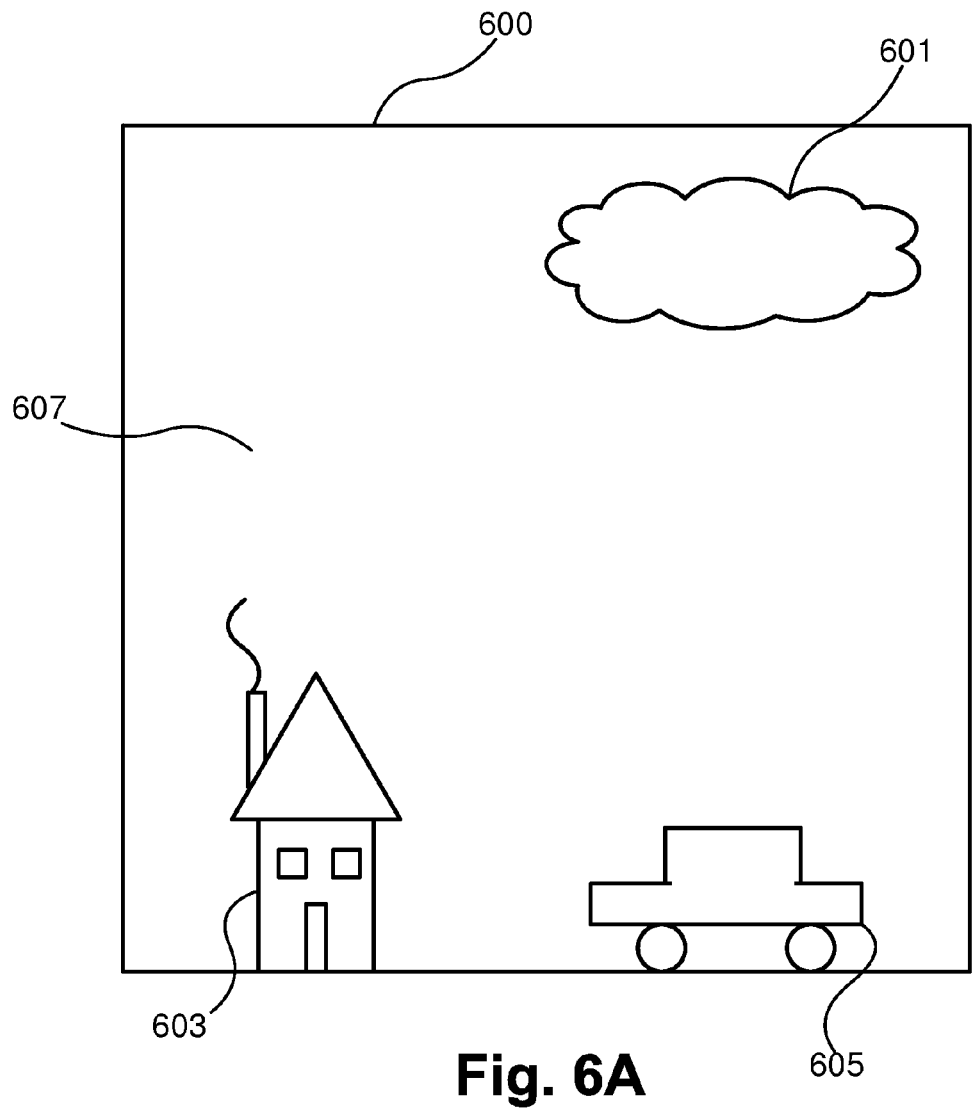
FIG. 6A shows an example input image.
Figure 6B:
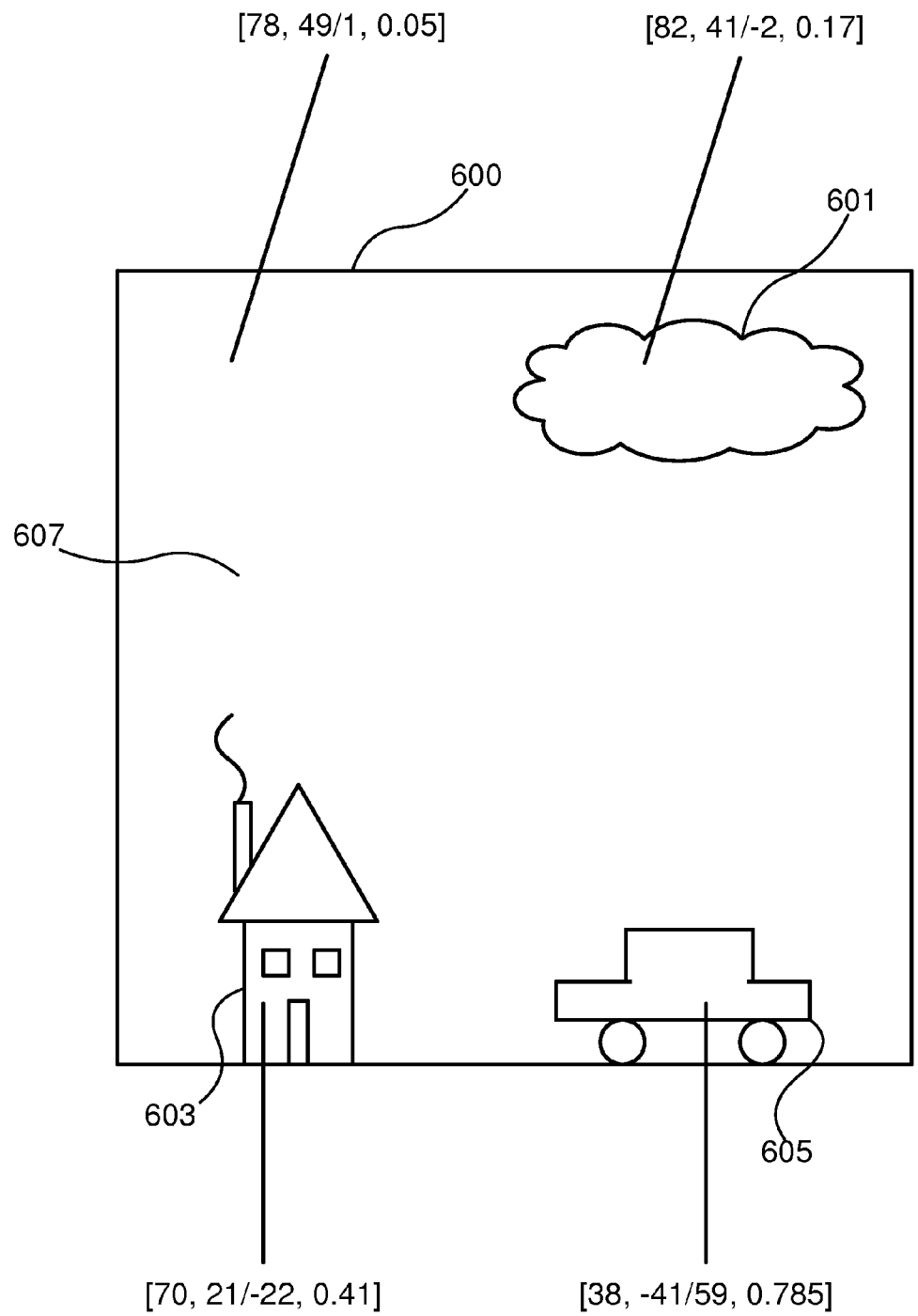
FIG. 6B shows a decomposed input image.
Figure 6C:
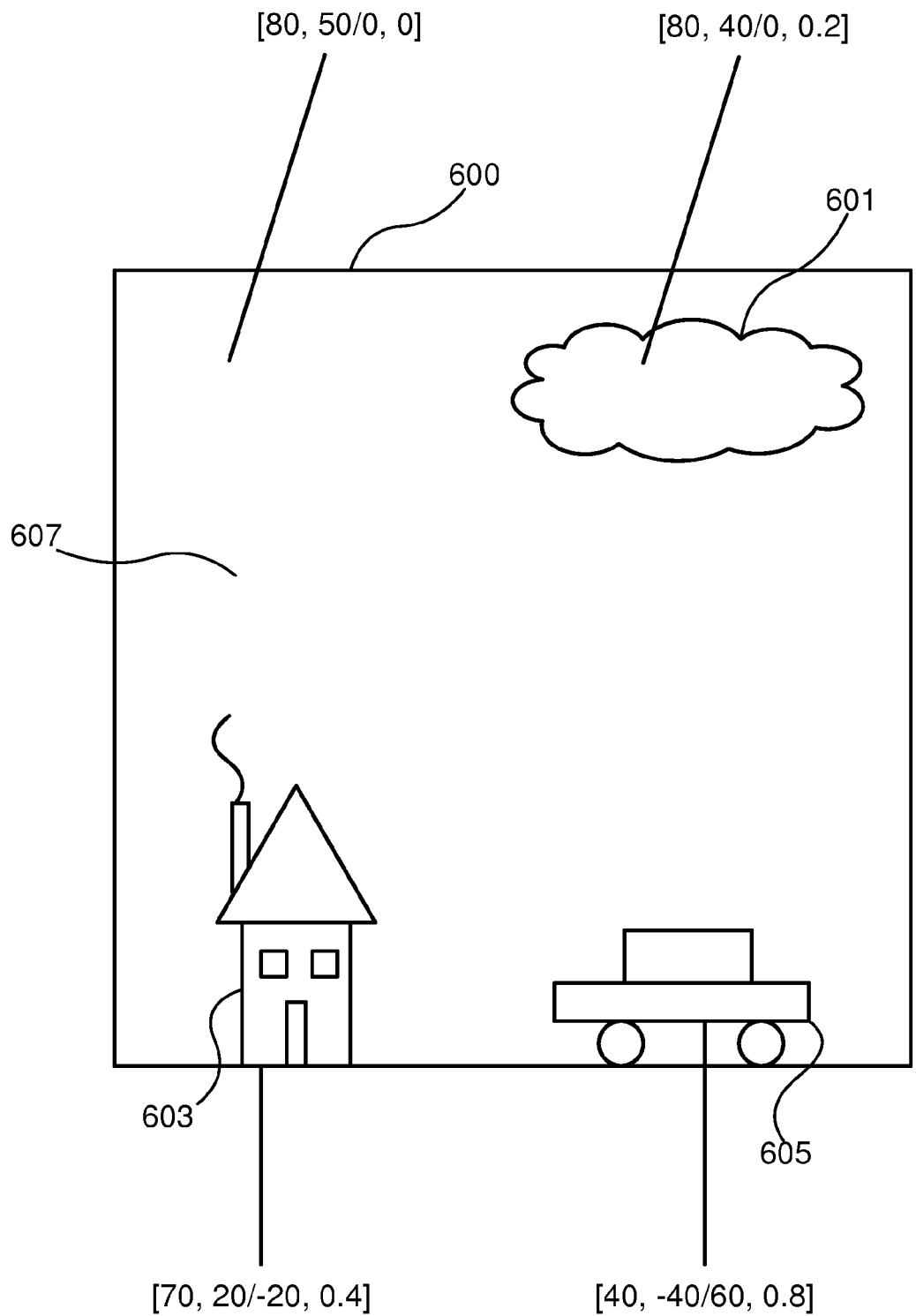
FIG. 6C shows a re-sampled input image.

The method 100 will be further described by way of example with reference to FIGS. 6A, 6B and 6C.

FIG. 6A shows a line drawing of an example input image 600 comprising four distinct elements, including a house 603, a car 605, a cloud 601 and a uniform background 607. The input image 600 may be processed in accordance with the method 100.

FIG. 6B shows feature values (e.g., [78, 49/1, 0.05]) for each of the four distinct elements 601, 603, 605 and 607 of the input image 600. In FIG. 6B, feature values are triplets including brightness, colour and sharpness. Accordingly, for the background element 607, the feature value triplet, [Brightness, Colour, Sharpness]=[78, 49/1, 0.05].

The "Colour" value of one of the feature values is composed of two variables, CIE Lab a* and b*, denoted as a*/b* in the feature value triplets (selected colours) shown in FIG. 6B. The "Brightness" value of one of the feature values is the CIE Lab L* channel and ranges in value from 0 to 100. The "Sharpness" value of one of the feature values is the intensity of Daubechies wavelet coefficients, which have been normalised and range in value between zero (0) to one (1). The triplet values shown in FIG. 6B result from the processing of the input image 500, in accordance with step 105 of the method 100.

FIG. 6C shows the image 600 where the feature triplet values have been rounded by the feature sampling step 107. The rounding is performed in terms of ten (10) units for brightness, and in terms of 0.1 units for the sharpness feature.

Figure 7A:
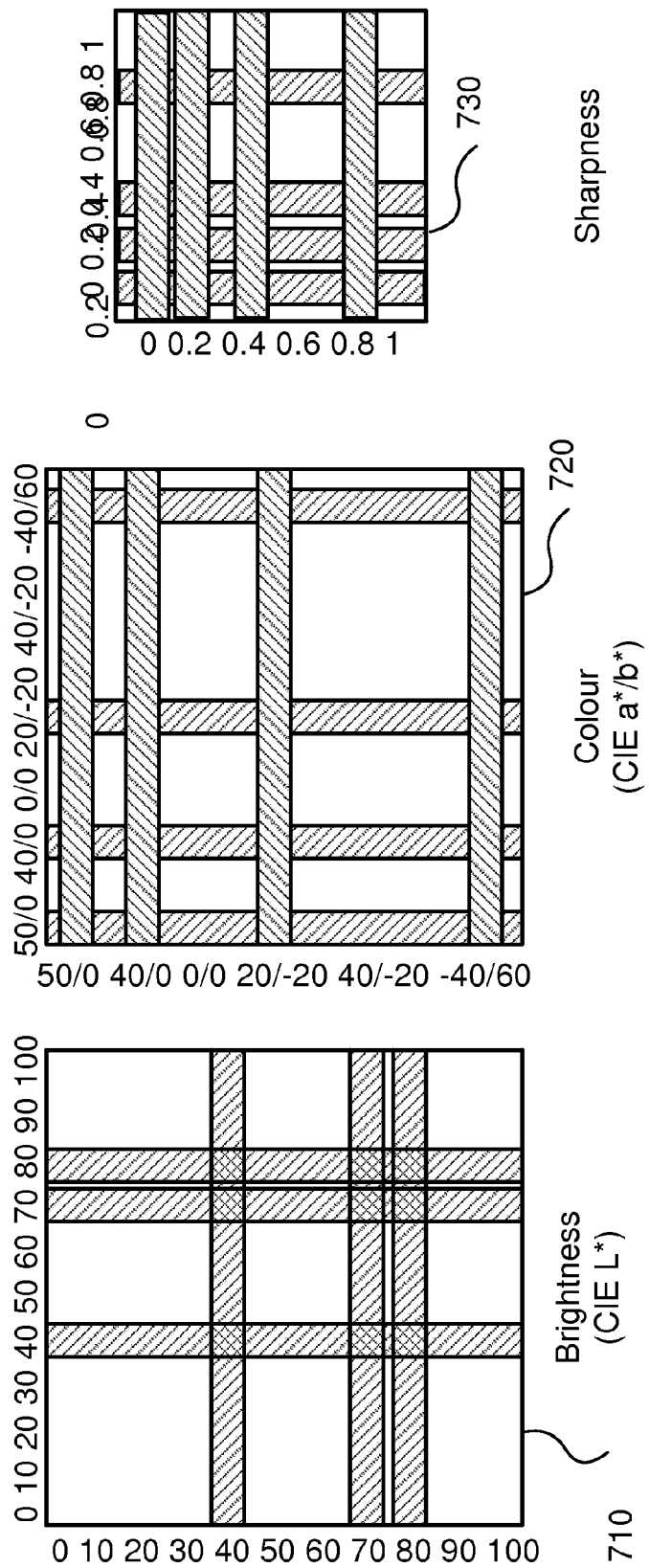
FIG. 7A show examples of matrices forming pre-determined data for the example image of FIG. 6A.

FIG. 7A shows an example of matrices forming the predetermined data stored within the memory 406 and/or hard disk drive 410 and accessed at step 103. FIG. 7A shows a matrix 710 for brightness, a matrix 720 for colour and a matrix 730 for sharpness. Highlights in the matrices 710, 720 and 730 correspond to rows and column values of the elements 601, 603, 605 and 607 present in the example image 600. The data populating the matrices 710, 720 and 730 was obtained from psychophysics experiments, according to the description above in relation to FIG. 5. Three distinct experiments were performed with distinct stimuli corresponding to varying degrees of luminance, colour, and sharpness, respectively. Observer saliency was recorded using a gaze tracking device.

Figure 7B:
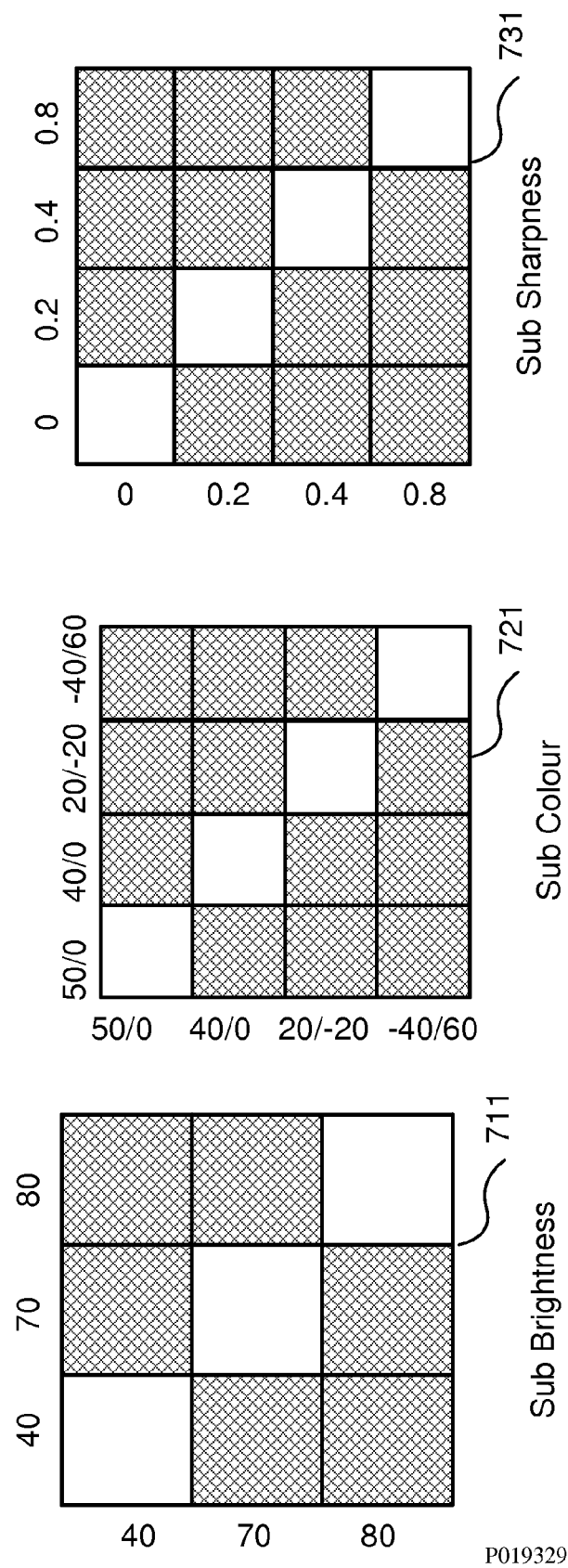
FIG. 7B is an example of sub data selection over matrices of FIG. 7A based on the values of the example image of FIG. 6.

FIG. 7B shows an example of three sub-data matrices 711, 721 and 731 obtained in accordance with the sub-data selection step 109 based on the example matrices 710, 720 and 730, respectively. The sub-data matrices 711, 721 and 731 of FIG. 7B are present for each feature and form of sub-data for brightness, colour and sharpness, respectively, for the image 500. Diagonal elements within the sub-data matrices 711, 721 and 731 are empty, since the saliency of an attribute with respect to itself is an ill-posed concept that may perturb further statistical analysis.

Figure 8A:
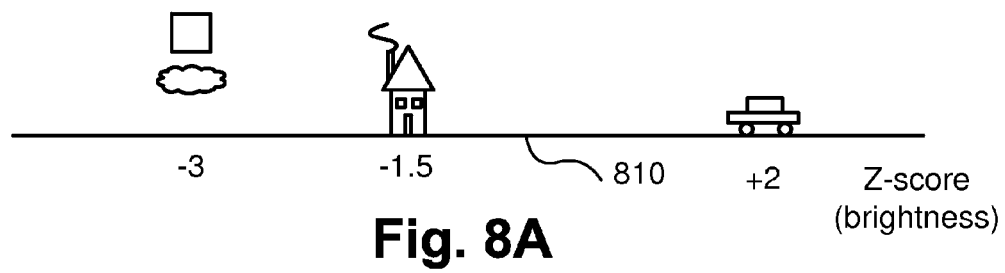
FIG. 8A is a representation of a perceptual scale determined for brightness based on the sub-data of FIG. 7B.
Figure 8B:
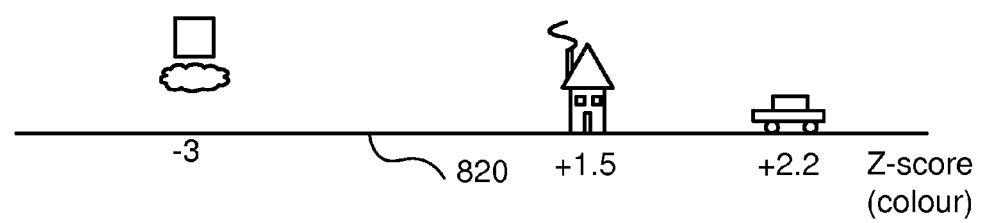
FIG. 8B is a representation of a perceptual scale determined for colour based on the sub-data of FIG. 7B.
Figure 8C:
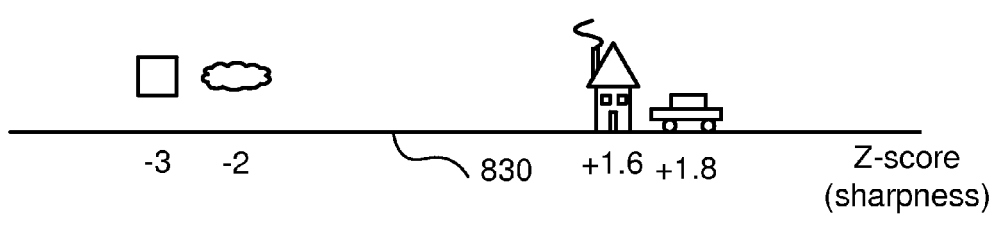
FIG. 8C is a representation of a perceptual scale determined for sharpness based on the sub-data of FIG. 7B.

FIGS. 8A, 8B, 8C and 8D show the result of applying the Z-score statistical model described above to the sub-data represented by the matrices 711, 721 and 731, as at step 111 of the method 100. As seen in FIGS. 8A, 8B and 8C, a Z-score corresponding to brightness, colour and sharpness, respectively, is determined for each of the elements 601, 603, 605 and 607 of the input image 600. A distinct perceptual scale, in terms of Z-scores, is determined for brightness, colour, and sharpness. FIG. 8A shows a perceptual scale 810 determined for the image 600 in relation to brightness based on the sub-matrix 711. FIG. 8B shows a perceptual scale 820 determined for the image 600 in relation to colour based on the sub-matrix 721. FIG. 8C shows a perceptual scale 830 determined for the image 600 in relation to sharpness based on the sub-matrix 731.

Figure 8D:
FIG. 8D is a representation of a perceptual scale determined by combining the perceptual scales of FIGS. 8A to 8C.

The individual perceptual scales are averaged and combined, as at step 115 of the method 100, to determine a single perceptual scale 840 as seen in FIG. 8D.

Figure 9A:
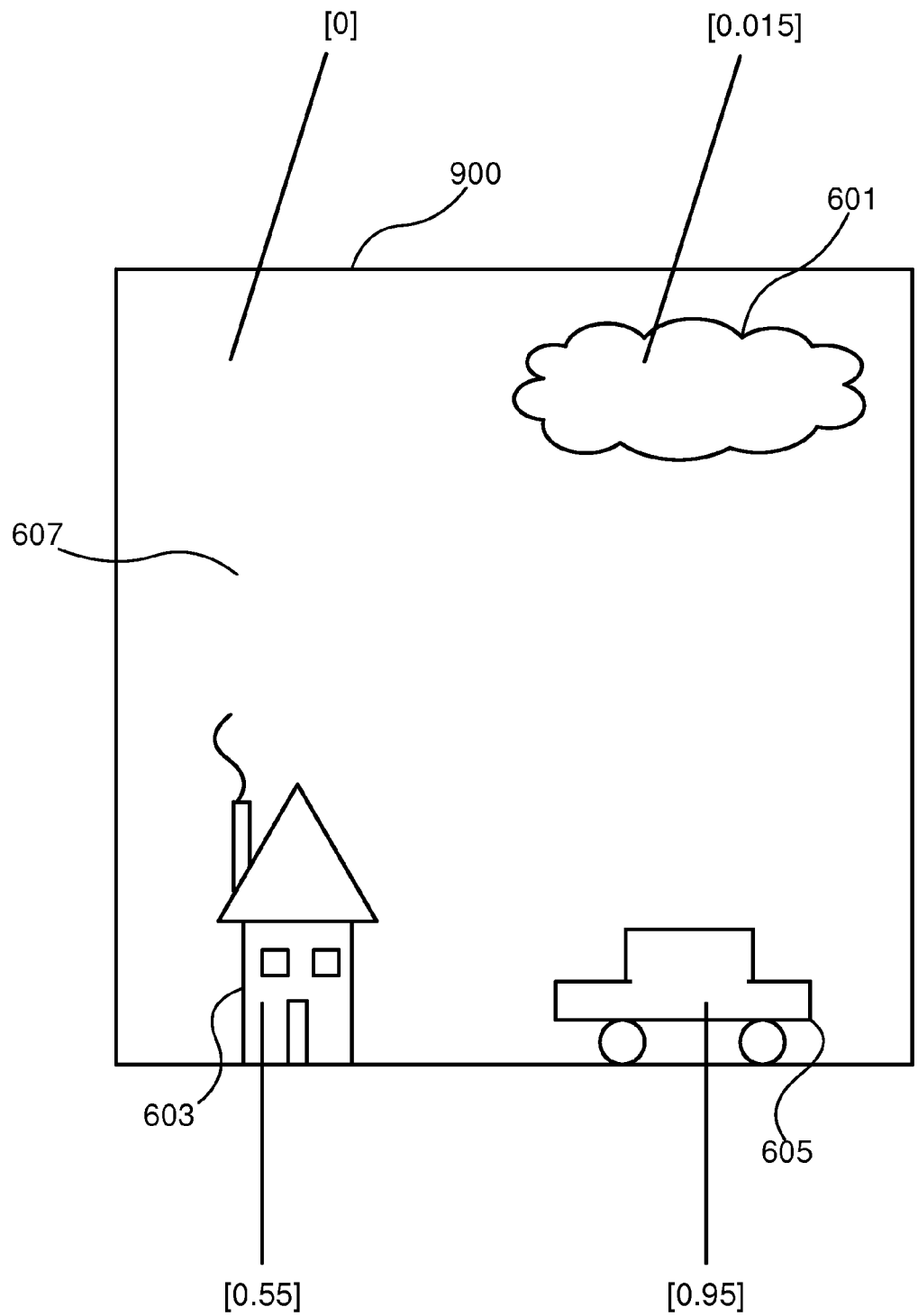
FIG. 9A is a line drawing example of a saliency map determined for the example image of FIG. 6A in accordance with the method of FIG. 1.

FIG. 9A shows a saliency map 900 determined by combining the input image 600 and the single perceptual scale 840, as at step 117. As seen in FIG. 9A, the Z-scores of the perceptual scale 840 have been transformed into probabilities according to a Normal distribution. The saliency map 900 includes a single saliency value, ranging for zero (0) to one (1), associated with each of the image elements 601, 603, 605 and 607. As seem in FIG. 9A, a single saliency value is determined per image element 601, 603, 605 and 607, for visibility purposes. Alternatively, a calculation and saliency value may be attributed to any pixel or group thereof for the image 600, depending on desired segmentation of the example input image 600. For example, if no segmentation is required or performed, the method 100 may be performed on a per-pixel basis for the input image.

Figure 9B:
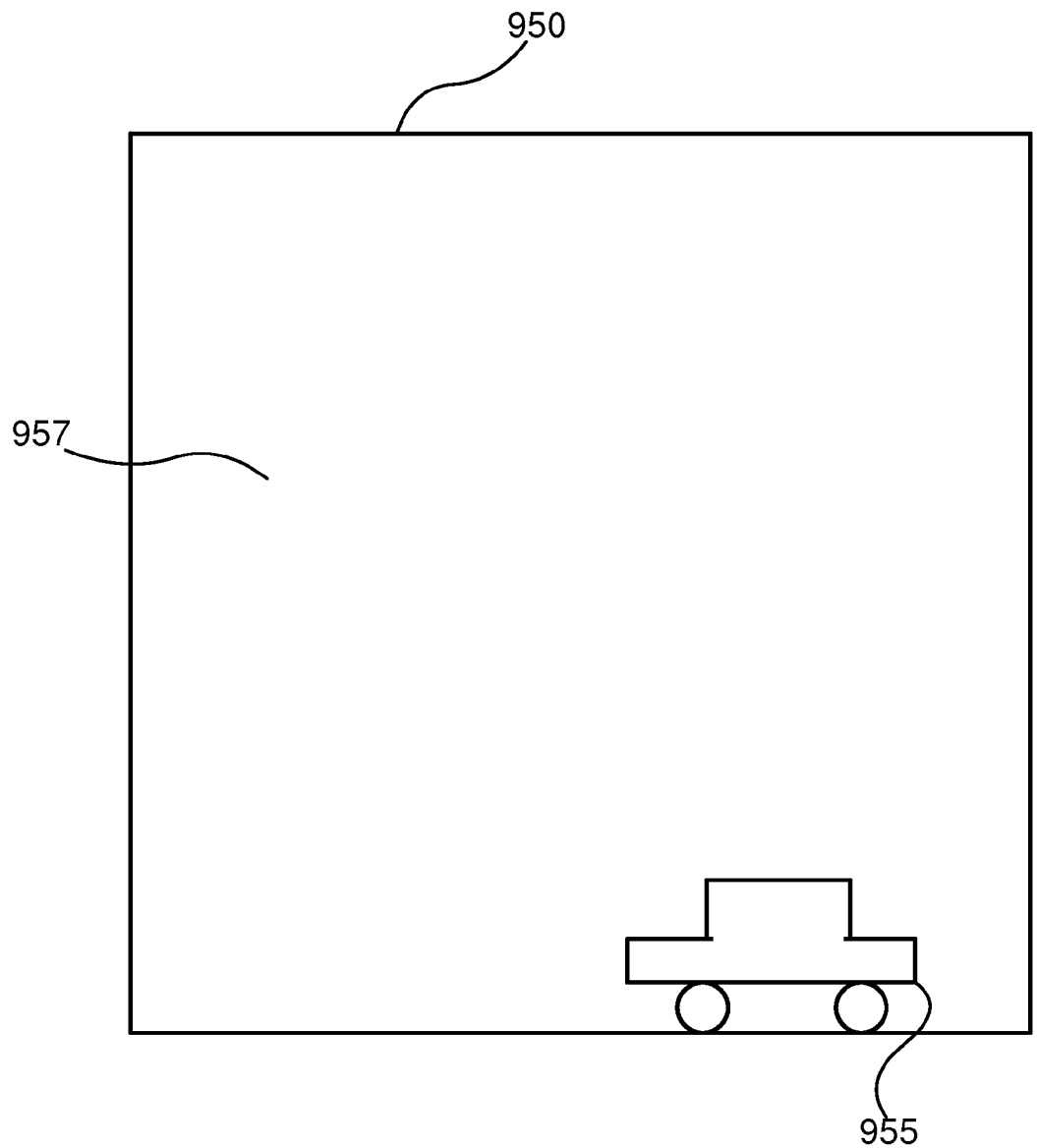
FIG. 9B is a line drawing example of a binary representation of the saliency map of FIG. 9A.

FIG. 9B shows a binary saliency map 950 determined for the example saliency map 900. The binary saliency map 950 may be determined by setting all elements of the saliency map 900 to zero (0) or one (1) if the saliency value is lower or greater than 0.75, respectively. In this instance, the binary saliency map 950 includes a zero-valued background region 957 and a salient, one (1)-valued region 955.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of determining a saliency map for an input image, said method comprising:

accessing predetermined data defining relative salience of image features, the predetermined data representing saliency observations obtained using psychophysical experimentation, and the predetermined data relating to multiple image features that are correlated with human perceptions of saliency;

decomposing the input image according to the predetermined data to identify image features of the input image that have corresponding image features in the predetermined data;

obtaining a perceptual scale, for each of the identified image features of the input image that have corresponding image features in the predetermined data, by:

selecting a portion of the predetermined data corresponding to a range of feature data values associated with the respective identified image feature, and determining the perceptual scale for the respective identified image feature using the respective selected portion of the predetermined data, the perceptual scale for the respective identified image feature being based on probabilities determined using the respective selected portion of the predetermined data; and determining the saliency map for the input image using the determined perceptual scale or the determined perceptual scales.

2. A method according to claim 1, wherein the saliency map is produced in a camera used to capture the input image.

3. A method according to claim 1, further comprising storing the saliency map as meta data.

4. A method according to claim 1, further comprising printing one or more elements using the saliency map.

5. A method according to claim 1, further comprising inputting the saliency map into other applications.

6. A method according to claim 1, wherein a single image feature is identified based on decomposing the input image.

7. An apparatus for determining a saliency map for an input image, said apparatus comprising:

means for accessing predetermined data defining relative salience of image features, the predetermined data representing saliency observations obtained using psychophysical experimentation, and the predetermined data relating to multiple image features that are correlated with human perceptions of saliency;

means for decomposing the input image according to the predetermined data to identify image features of the input image that have corresponding image features in the predetermined data;

means for obtaining a perceptual scale, for each of the identified image features of the input image that have corresponding image features in the predetermined data, by:

selecting a portion of the predetermined data corresponding to a range of feature data values associated with the respective identified image feature, and determining the perceptual scale for the respective identified image feature using the respective selected portion of the predetermined data, the perceptual scale for the respective identified image feature being based on probabilities determined using the respective selected portion of the predetermined data; and means for determining the saliency map for the input image using the determined perceptual scale or the determined perceptual scales.

8. A system for determining a saliency map for an input image, said system comprising:

a memory for storing data and a computer program;

a processor coupled to said memory for executing said computer program, said computer program comprising instructions for:

accessing predetermined data defining relative salience of image features, the predetermined data representing saliency observations obtained using psychophysical experimentation, and the predetermined data relating to multiple image features that are correlated with human perceptions of saliency;

decomposing the input image according to the predetermined data to identify image features of the input image that have corresponding image features in the predetermined data;

obtaining a perceptual scale, for each of the identified image features of the input image that have corresponding image features in the predetermined data, by:

selecting a portion of the predetermined data corresponding to a range of feature data values associated with the respective identified image feature, and determining the perceptual scale for the respective identified image feature using the respective selected portion of the predetermined data, the perceptual scale for the respective identified image feature being based on probabilities determined using the respective selected portion of the predetermined data; and determining the saliency map for the input image using the determined perceptual scale or the determined perceptual scales.

9. A non-transitory computer readable medium having a computer program stored thereon, said program executed by at least one processor for determining a saliency map for an input image, said program comprising:

code for accessing predetermined data defining relative salience of image features, the predetermined data representing saliency observations obtained using psychophysical experimentation, and the predetermined data relating to multiple image features that are correlated with human perceptions of saliency;

code for decomposing the input image according to the predetermined data to identify image features of the input image that have corresponding image features in the predetermined data;

code for obtaining a perceptual scale, for each of the identified image features of the input image that have corresponding image features in the predetermined data, by:

selecting a portion of the predetermined data corresponding to a range of feature data values associated with the respective identified image feature, and determining the perceptual scale for the respective identified image feature using the respective selected portion of the predetermined data, the perceptual scale for the respective identified image feature being based on probabilities determined using the respective selected portion of the predetermined data; and code for determining the saliency map for the input image using the determined perceptual scale or the determined perceptual scales.

* * * * *